United States Patent
Akiyama

(10) Patent No.: US 9,536,125 B2
(45) Date of Patent: Jan. 3, 2017

(54) DATA DETERMINATION DEVICE, LIBRARY DEVICE, AND DATA DETERMINATION METHOD

(71) Applicant: FUJITSU LIMITED, Kawasaki-shi, Kanagawa (JP)

(72) Inventor: Yoshiki Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/829,951

(22) Filed: Aug. 19, 2015

(65) Prior Publication Data

US 2016/0098587 A1    Apr. 7, 2016

(30) Foreign Application Priority Data

Oct. 6, 2014  (JP) ................................ 2014-205754

(51) Int. Cl.
*G06F 19/00* (2011.01)
*G06K 7/14* (2006.01)
*G06K 7/10* (2006.01)

(52) U.S. Cl.
CPC ......... *G06K 7/1473* (2013.01); *G06K 7/10722* (2013.01)

(58) Field of Classification Search
CPC ...... B41C 1/1083; B41F 27/1206; B65H 1/26; B65H 2301/42252; B65H 2301/42254; B65H 2701/1928; G06K 13/08; G06K 19/06018; G06K 19/06037; G06K 19/06056; G06K 2019/06225; G06K 7/0004; G06K 7/12

USPC .......................................... 235/385, 370, 381
See application file for complete search history.

(56) References Cited

U.S. PATENT DOCUMENTS

| | | | |
|---|---|---|---|
| 5,468,946 A | 11/1995 | Oliver | |
| 2004/0026508 A1* | 2/2004 | Nakajima | G06K 7/14 235/454 |
| 2005/0230470 A1* | 10/2005 | Hoshino | G11B 15/6885 235/375 |
| 2006/0178578 A1* | 8/2006 | Tribble | B65B 3/003 600/432 |
| 2007/0071320 A1* | 3/2007 | Yada | G06K 7/1456 382/181 |

(Continued)

FOREIGN PATENT DOCUMENTS

| | | |
|---|---|---|
| JP | 5-89278 | 4/1993 |
| JP | 8-44809 | 2/1996 |

(Continued)

*Primary Examiner* — Thien M Le
(74) *Attorney, Agent, or Firm* — Staas & Halsey LLP

(57) ABSTRACT

A data determination device includes a plurality of determination units that determine, based on respective different criteria, whether each of plural pieces of data included in a sequence of read data of a barcode represents either a first value or a second value, the plural pieces of data being output from a read unit in response to an instruction for reading the barcode, and a selection unit that selects, from a plurality of determination results obtained by each determination unit for the plural pieces of data, a plurality of determination results obtained by one determination unit based on a selection condition preset in accordance with a standard of the barcode, and outputs the selected plurality of determination results to a source of the instruction for reading.

15 Claims, 17 Drawing Sheets

(56) References Cited

U.S. PATENT DOCUMENTS

| | | | | |
|---|---|---|---|---|
| 2007/0274704 A1* | 11/2007 | Nakajima | ............ | G06F 17/242 396/310 |
| 2008/0101698 A1* | 5/2008 | Yago | ................. | G06K 9/00449 382/171 |
| 2011/0271860 A1* | 11/2011 | Barthelme | ......... | B41F 27/1206 101/477 |
| 2015/0083794 A1* | 3/2015 | Ostwald | ............... | G06K 9/3216 235/375 |

FOREIGN PATENT DOCUMENTS

| | | |
|---|---|---|
| JP | 2002-32711 | 1/2002 |
| WO | 2005/004142 A1 | 1/2005 |

\* cited by examiner

FIG. 12
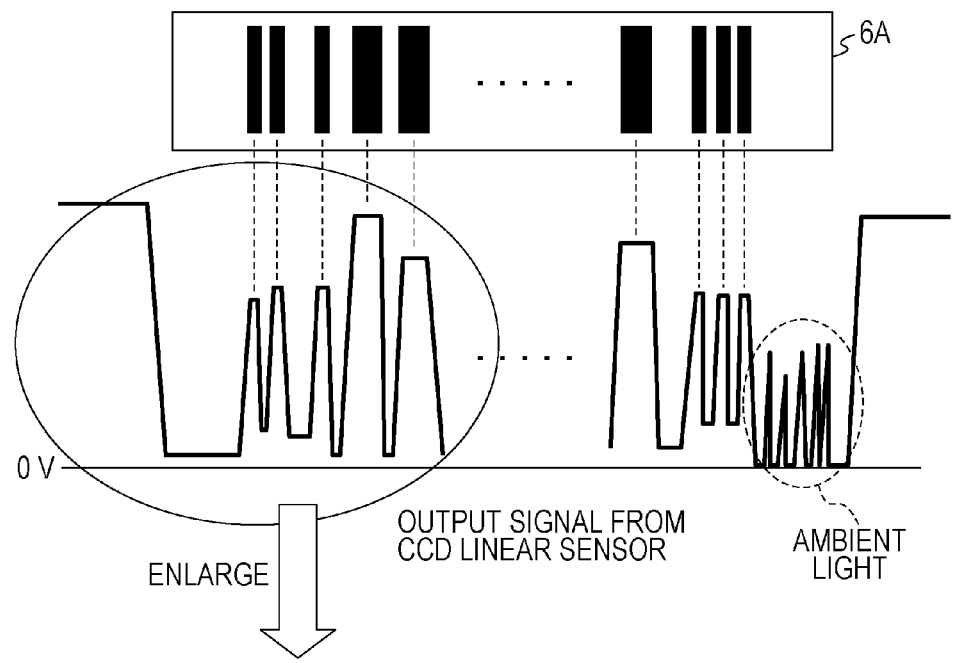
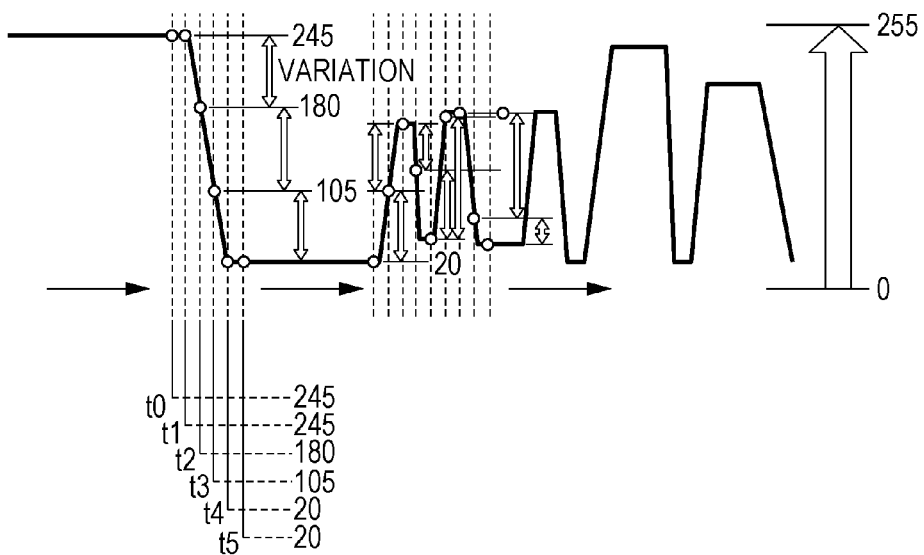

FIG. 13

| TIME AXIS | DATA VALUE | DIFFERENCE (Δx) FROM PREVIOUS TIME | DETERMINATION RESULT OF COMPARISON UNIT | | | | |
|---|---|---|---|---|---|---|---|
| | | | Δ1 = 20 | Δ2 = 40 | Δ3 = 60 | Δ4 = 80 | Δ5 = 100 |
| INITIAL VALUE | 255 | – | BLACK (INITIAL VALUE) | BLACK (INITIAL VALUE) | BLACK (INITIAL VALUE) | BLACK (INITIAL VALUE) | BLACK (INITIAL VALUE) |
| t0 | 245 | 10 | BLACK | BLACK | BLACK | BLACK | BLACK |
| t1 | 245 | 0 | BLACK | BLACK | BLACK | BLACK | BLACK |
| t2 | 180 | 65 | WHITE | WHITE | WHITE | BLACK | BLACK |
| t3 | 105 | 75 | WHITE | WHITE | WHITE | BLACK | BLACK |
| t4 | 20 | 85 | WHITE | WHITE | WHITE | WHITE | BLACK |
| t5 | 20 | 0 | WHITE | WHITE | WHITE | WHITE | BLACK |

61

DATA DETERMINATION DEVICE, LIBRARY DEVICE, AND DATA DETERMINATION METHOD

CROSS-REFERENCE TO RELATED APPLICATION

This application is based upon and claims the benefit of priority of the prior Japanese Patent Application No. 2014-205754, filed on Oct. 6, 2014, the entire contents of which are incorporated herein by reference.

FIELD

The embodiment discussed herein is related to a barcode data determination device, a library device, and a barcode data determination method.

BACKGROUND

There are known library devices in which a plurality of medium cartridges (recording media) such as magnetic tape cartridges and optical disk cartridges are stored. In a library device, medium cartridges are stored in units of cells in a plurality of storage cells arranged inside a housing.

The library device picks up, transports, and places (inserts) medium cartridges between housing cells and drive modules by using transfer robots based on movement instructions from a host, thereby recording and reproducing media placed into the drive modules.

A barcode label on which a barcode containing medium management information is marked is affixed to the cartridge back of a medium cartridge and is read by a barcode reader mounted on a transfer robot. The barcode reader includes a light emitting diode (LED) lighting unit in which LEDs are arranged in a line layout, and a charge coupled device (CCD) linear sensor. In a state where the transfer robot faces the cartridge back (barcode label), the library device turns on the LED lighting unit, performs scanning by using the CCD linear sensor, and decodes a scanning result. Thus, the library device may read a barcode (acquire medium management information).

In the library device, upon startup of the device or according to an instruction from a host, an inventory process is performed in which, for a stored medium cartridge, medium management information and positional information are managed (registered) in association with each other.

In the inventory process, the library device continuously reads barcode labels of multiple medium cartridges stored therein and notifies the host of what positions in the device the medium cartridges are stored. For example, after the library device moves and positions the transfer robot at the top or bottom cell position in a column to be processed (a vertical line of the storage cell), the library device moves the transfer robot downward or upward at a regular speed while causing the barcode reader to perform scanning operations. Thus, the library device continuously reads the barcode labels of the medium cartridges.

Regarding a method for reading barcodes, various techniques are known (refer to, for example, International Publication Pamphlet No. WO 2005/004142, Japanese Laid-open Patent Publication No. 08-044809, Japanese Laid-open Patent Publication No. 05-089278, and Japanese Laid-open Patent Publication No. 2002-032711).

However, various factors in an environment where a barcode reader reads a barcode cause read errors or incorrect recognition, and, as a result, the barcode is sometimes not correctly read. In such a case, although retry processing in which a read operation is performed again may be carried out, movement of the transfer robot is a mechanical operation and therefore the response time to the host may be delayed by the retry processing.

In particular, in a large-scale library device, medium cartridges stored therein sometimes reach several hundreds. The larger the number of medium cartridges stored is, the longer the time used for the inventory process is. Therefore, when, in the inventory process, barcodes are not correctly read and retry processing occurs frequently, notification to the host is substantially delayed. Thus, it takes a large amount of time to make the library device available again.

SUMMARY

According to an aspect of the invention, a data determination device includes a plurality of determination units that determine, based on respective different criteria, whether each of plural pieces of data included in a sequence of read data of a barcode represents either a first value or a second value, the plural pieces of data being output from a read unit in response to an instruction for reading the barcode, and a selection unit that selects, from a plurality of determination results obtained by each determination unit for the plural pieces of data, a plurality of determination results obtained by one determination unit based on a selection condition preset in accordance with a standard of the barcode, and outputs the selected plurality of determination results to a source of the instruction for reading.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of a result of sampling performed by an A/D conversion unit for part (enlarged view) of an output wave from the CCD linear sensor;

FIG. 13 is a diagram depicting a determination result example in each comparison unit when data illustrated in FIG. 12 is input by the A/D conversion unit;

DESCRIPTION OF EMBODIMENT

Figure 1:
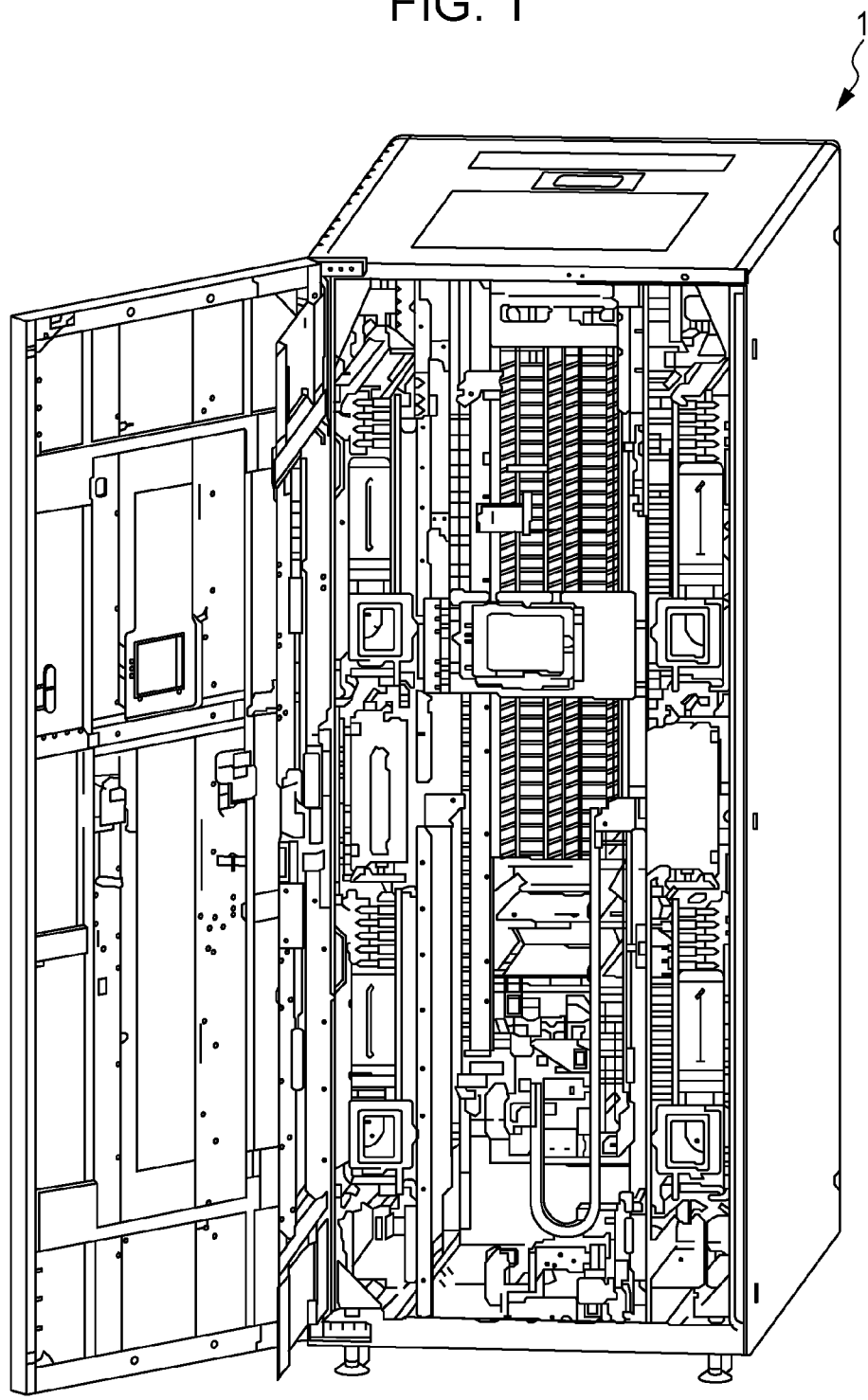
FIG. 1 is a perspective view illustrating an example of a library device according to an embodiment.

Hereinafter, an embodiment of the present disclosure will be described with reference to the accompanying drawings. However, the embodiment described hereinafter is merely exemplary and is not intended to exclude various modifications and technical applications that are not explicitly described herein. That is, the present embodiment may be carried out in various modified manners without departing from the gist thereof. It is to be noted that, in the drawings used in the embodiment described hereinafter, portions denoted by the same reference numerals represent the same or similar portions unless particularly stated otherwise.

Initially, with reference to FIG. 1 to FIG. 5, a library device according to an embodiment will be described.

FIG. 1 is a perspective view illustrating an example of a library device 1 according to an embodiment. As illustrated in FIG. 1, the library device 1 may be a rack-type device capable of being installed in facilities such as data centers and server rooms. Note that a device in another form, for example, a larger scale modular architecture device may be used as the library device 1.

Figure 2:
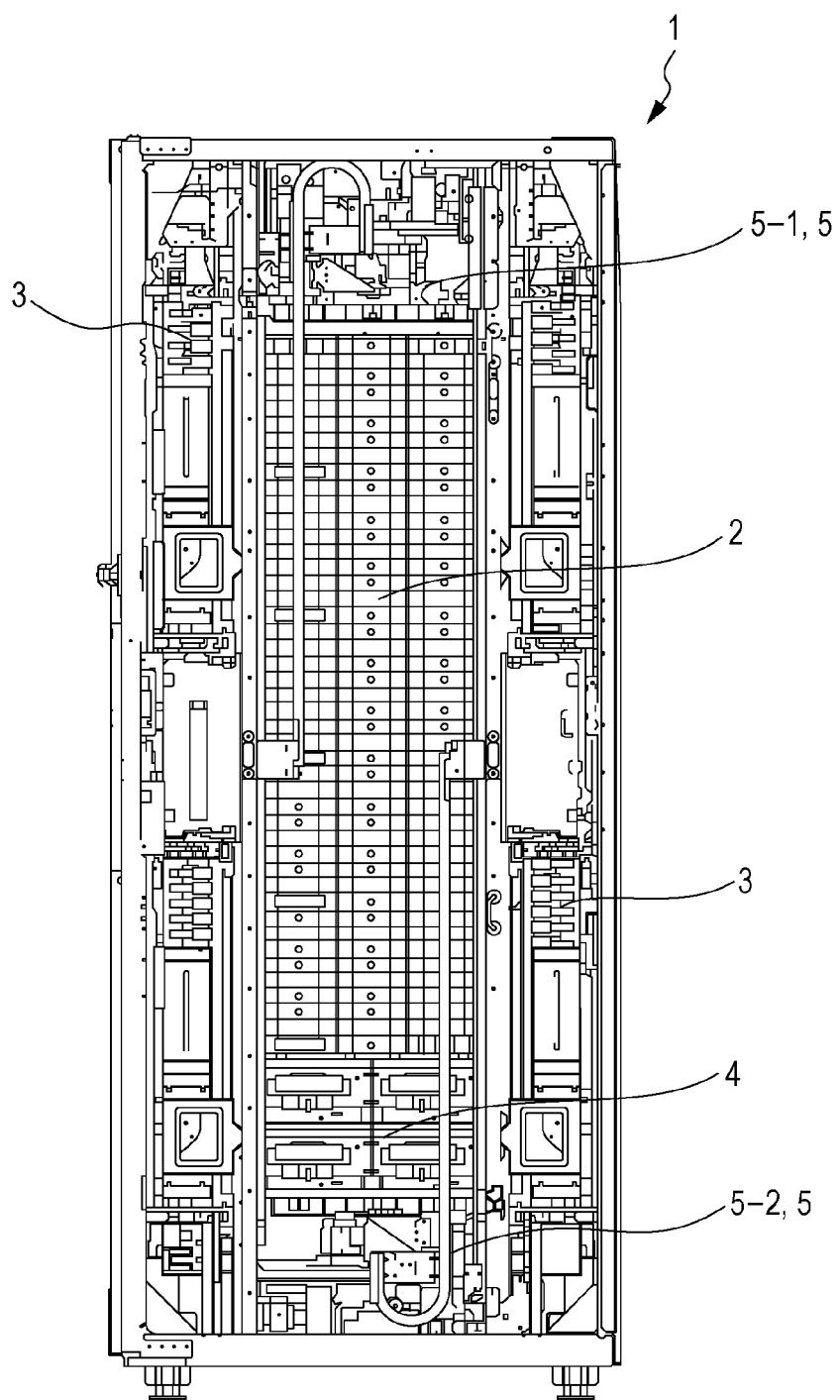
FIG. 2 is a front view of the library device illustrated in FIG. 1.

FIG. 2 is a front view of the library device 1 illustrated in FIG. 1. The library device 1 includes a back cell 2 at a rear location on the front side of the inside of the rack, and side cells 3 on both sides of the inside of the rack. The back cell 2 and the side cells 3 are each provided with a plurality of storage cells for storing medium cartridges. Note that the library device 1 (the back cell 2 and the side cells 3) according to the embodiment is capable of storing several hundred medium cartridges 6.

The library device 1 also includes a drive module 4, an upper robot 5-1 and a lower robot 5-2 (hereinafter each referred to simply as a transfer robot 5 when they are not discriminated from each other).

The drive module 4, in response to an instruction from the host 7 or an upper-level control unit 8 described below (refer to FIG. 5), records or reproduces data on a medium within the placed (inserted) medium cartridge 6 (refer to FIG. 5).

The transfer robot 5, in response to an instruction from the host 7 or the upper-level control unit 8, picks up, transfers, and places (inserts) the medium cartridge 6 between a storage cell and the drive module 4.

Figure 3:
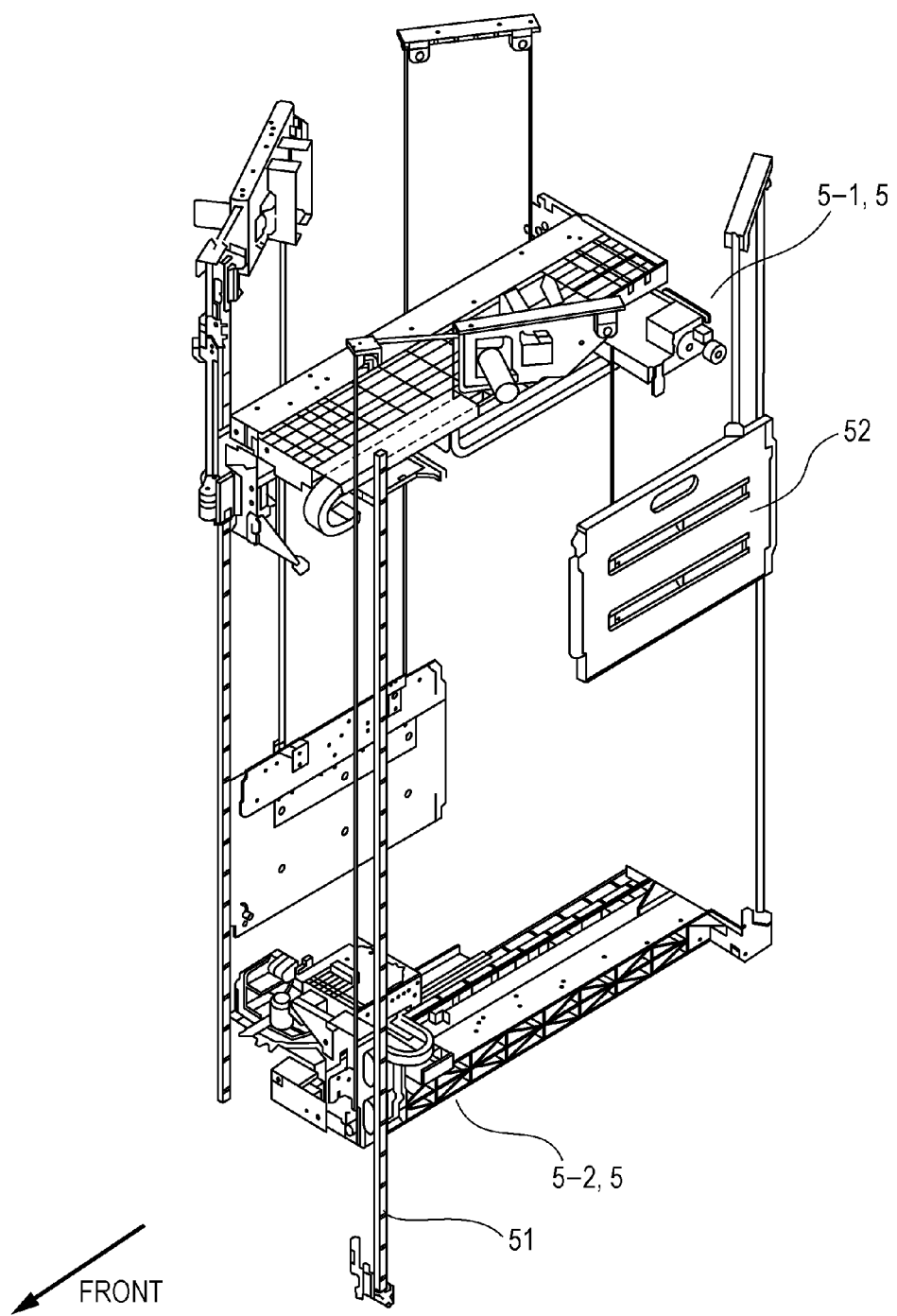
FIG. 3 is a perspective view in which a configuration related to a transfer robot is extracted from the library device illustrated in FIG. 1.

FIG. 3 is a perspective view illustrating a configuration related to the transfer robot 5 extracted from the library device 1 illustrated in FIG. 1. The transfer robot 5, when driven by a motor, is capable of moving in the vertical direction within a rack, using a rail (Y mechanism) 51 as a guide. Note that the transfer robot 5 is controlled by a balancer 52 so as to maintain a horizontal posture.

Figure 4:
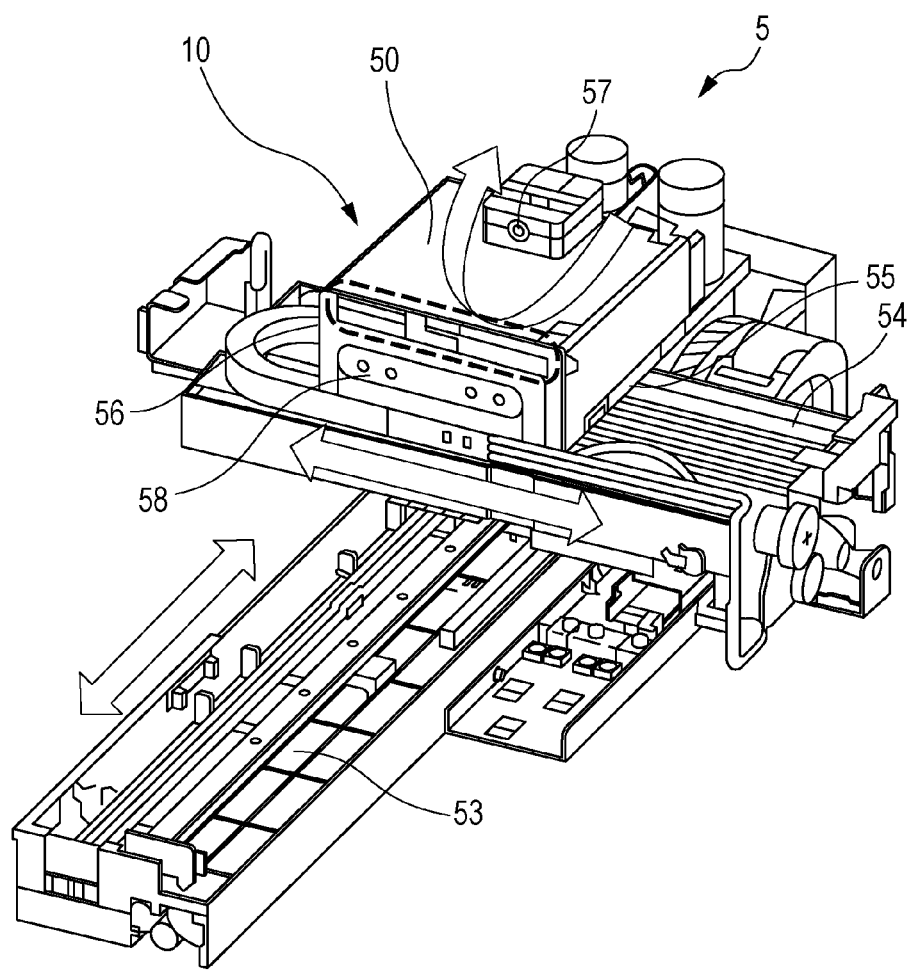
FIG. 4 illustrates an example of a configuration of the transfer robot and the periphery thereof.

FIG. 4 illustrates an example of a configuration of the transfer robot 5 and the periphery thereof. A barcode reader 10 is mounted on the transfer robot 5. The transfer robot 5 is capable of freely moving in the horizontal direction in the rack by using a Z mechanism 53, an X mechanism 54, and a swivel mechanism 55 that are driven by a motor. The Z mechanism 53 moves the transfer robot 5 in the depth direction of the rack, and the X mechanism 54 moves the transfer robot 5 in the right-and-left direction of the rack. The swivel mechanism 55 rotates the transfer robot 5 up to about 270 degrees in the horizontal plane (X-Z plane). The transfer robot 5 may transport the medium cartridge 6 grasped by a hand mechanism 58 from the movement source to the movement destination by using the rail 51, the Z mechanism 53, and the X mechanism 54 and may cause the medium cartridge 6 to face a storage cell or the drive module 4 serving as the movement destination by using the swivel mechanism 55.

The LED lighting unit 56, in which a plurality of LEDs are arranged in a line, is an example of a light source that applies light to a barcode label 6A (refer to FIG. 6) of the medium cartridge 6.

A CCD linear sensor 57, in which a plurality of photodiodes are arranged in a line and a CCD is coupled to each photodiode, detects reflected light from the barcode label 6A by turning on the LED lighting unit 56 and converts the detected light into electrical signals, for example, voltage signals. The CCD linear sensor 57 is considered to be an example of a "read unit" that, in response to an instruction for reading a barcode from the host 7 or the upper-level control unit 8, outputs a sequence of read data of a barcode composed of plural pieces of data.

The hand mechanism 58 includes a hand unit such as a claw or an arm that grasps the medium cartridge 6 and an accommodation unit that accommodates the medium cartridge 6 grasped by the hand unit. The hand mechanism 58 picks up (takes out) the medium cartridge 6 from a storage cell or the drive module 4 serving as the movement source, causes the medium cartridge 6 to be accommodated within the transfer robot 5, and places (inserts) the medium cartridge 6 into a storage cell or the drive module 4 serving as the movement destination.

The transfer robot 5 also includes a control board 50 that reads the barcode label 6A of the medium cartridge 6 through control over the LED lighting unit 56 and the CCD linear sensor 57 and transmits a read result to the upper-level control unit 8. Examples of the control board 50 include integrated circuits of large scale integration (LSI) and the like, and print plates (circuit boards) including at least one of electronic circuits such as an application specific integrated circuit (ASIC), a field programmable gate array (FPGA), and a micro-processing unit (MPU).

In this way, the LED lighting unit 56, the CCD linear sensor 57, and the control board 50 may function as the barcode reader 10 that reads a barcode of one medium cartridge 6 in response to an instruction for reading the barcode.

The medium cartridge 6 is an example of a recording medium that stores data of, for example, magnetic tape cartridges and optical disk cartridges. The magnetic tape cartridges include, for example, a linear tape-open (LTO) Ultrium tape. The optical disk cartridges include cartridges that store optical disks such as, for example, compact discs (CDs), digital versatile discs (DVDs), and Blu-ray discs. Examples of the CDs include a CD-read-only memory (CD-ROM), a CD-recordable (CD-R), a CD-rewritable (CD-RW), and so on, and examples of the DVDs include a DVD-ROM, a DVD-random access memory (DVD-RAM), a DVD-R, a DVD-RW, a DVD+R, a DVD+RW, and so on. Note that it is preferable that, among these optical disks, rewritable optical disks be used.

Hereinafter, description will be given assuming that, in the embodiment, a magnetic tape cartridge is used as the medium cartridge 6 and the drive module 4 is a tape drive.

Figure 5:
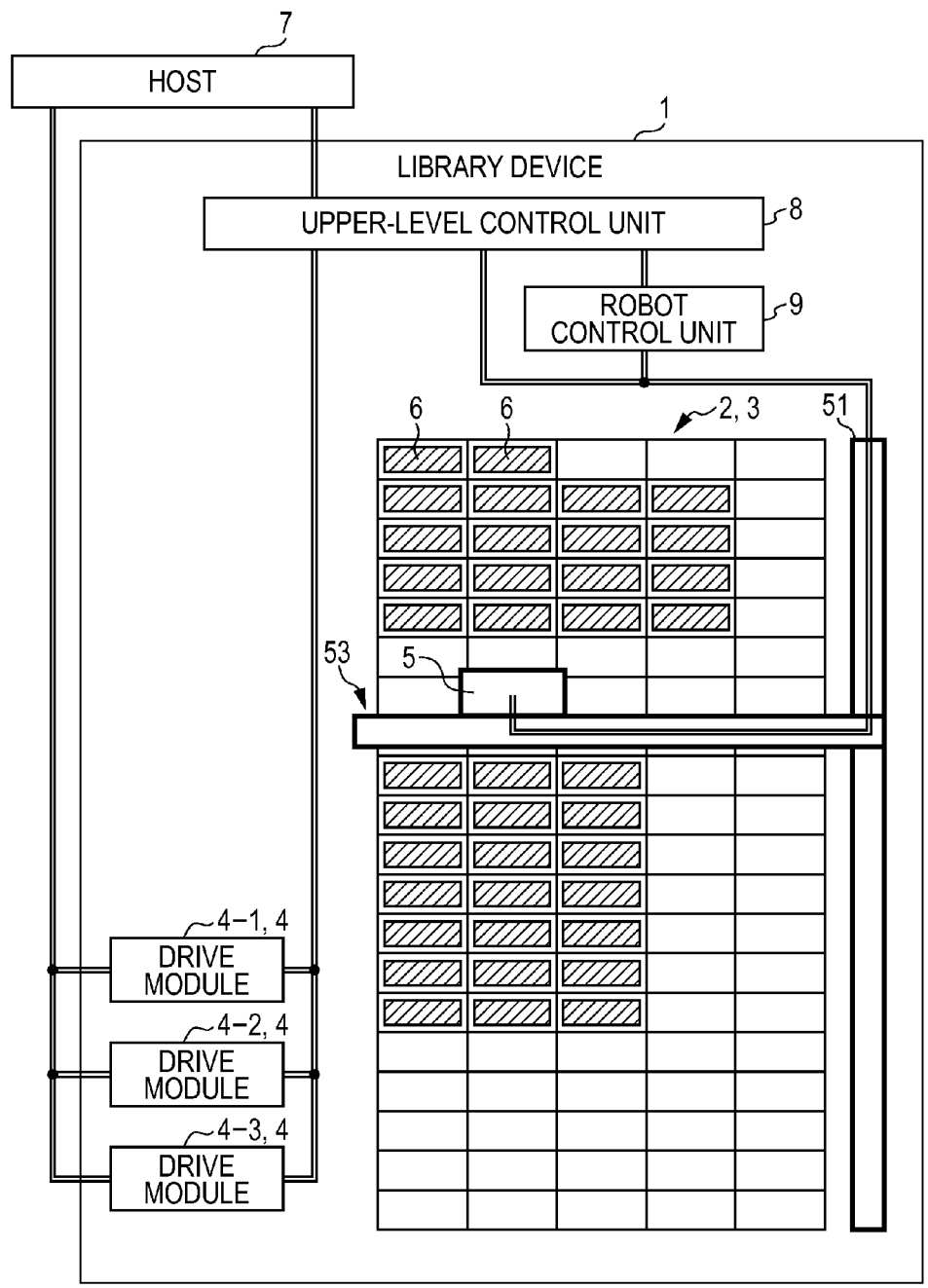
FIG. 5 is a diagram illustrating an example of operations of the library device.

FIG. 5 is a diagram illustrating an example of operations of the library device 1. The library device 1 controls the transport robot 5 and the drive module 4 in response to an instruction from the host 7 coupled via a communication cable such as a fibre channel (FC).

The host 7 instructs the library device 1 to place the medium cartridge 6 from the movement source to the movement destination in storage cells and the drive modules 4, to record write data to or reproduce read data from the medium cartridge 6, and to perform the inventory process and the like. Note that examples of the host 7 include information processing devices such as servers and personal computers (PCs).

The library device 1, as illustrated in FIG. 5, includes the upper-level control unit 8 and the robot control unit 9 in addition to the back cell 2, the side cell 3, the drive module 4, and the transfer robot 5 mentioned above.

The upper-level control unit 8, in response to instructions from the host 7, provides control to the robot control unit 9 for the movement of the transfer robot 5, provides control to the transfer robot 5 for reading the barcode label 6A, and provides control to the drive module 4 for recording or reproducing of the medium cartridge 6. Examples of the upper-level control unit 8 include information processing devices such as servers and PCs including processors such as central processing units (CPUs), memories such as a RAM, storage devices such as a hard disk drive (HDD) and a solid state drive (SSD), and so on.

The robot control unit 9, in response to an instruction (control) from the upper-level control unit 8, controls driving of each motor that moves the transfer robots 5. Examples of the motors include a motor that moves the transfer robot 5 in the vertical direction along the rail 51, a motor that moves the transfer robot 5 in the depth direction and in the right-and-left direction by using the Z mechanism 53 and the X mechanism 54, a motor of the swivel mechanism 55 that rotates the transfer robot 5 in the X-Z plane, and the like. Examples of the robot control unit 9 include integrated circuits such as ASICs and MPUs.

The upper-level control unit 8, after startup of the library device 1 or in response to an instruction from the host 7, performs the inventory process for registering the medium cartridge 6 stored in the back cell 2 and the side cells 3.

In the inventory process, the upper-level control unit 8 instructs the robot control unit 9 and the transfer robot 5 to read medium management information of the medium cartridges 6 stored in storage cells, for example, volume numbers, and to issue notification of the volume numbers and the positional information of the storage cells. The robot control unit 9 moves and positions the transfer robot 5 to a cell position at the top or bottom of a column (a vertical series of storage cells) to be processed and then moves the transfer robot 5 upward or downward at a regular speed.

In accordance with the movement of the transfer robot 5 caused by the robot control unit 9, the transfer robot 5 sequentially scans the back surfaces (the barcode labels 6A) of the medium cartridges 6 by using the barcode reader 10. Scan results are transmitted from the control board 50 directly or via the robot control unit 9 to the upper-level control unit 8. The upper-level control unit 8 decodes the scan results, recognizes the characters of barcodes, and acquires medium management information (volume numbers). Upon completion of checking all the storage cells, the upper-level control unit 8 notifies the host 7 of the collected volume numbers and positional information of storage cells and completes the inventory process.

The volume numbers and the positional information of storage cells collected through the inventory process are used for identifying the medium cartridge 6 and the storage cell when the host 7 provides an instruction for access to the medium cartridge 6.

Figure 6:
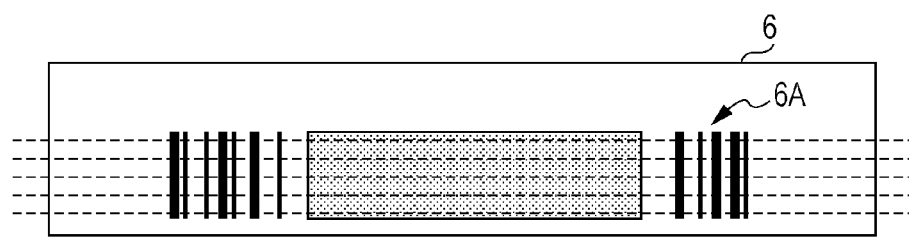
FIG. 6 is a diagram illustrating an example of a barcode label affixed to a medium cartridge.

Note that, as illustrated in FIG. 6, the barcode reader 10 moves the transfer robot 5 downward or upward for one barcode label 6A and scans the barcode label 6A a plurality of times at different positions indicated by broken lines. If the barcode is able to be recognized several times or more by the upper-level control unit 8, the reading may be considered to be successful.

As described above, several hundred medium cartridges 6 may be stored in the library device 1. In the inventory process, it is preferable that, the larger the number of stored medium cartridges 6 is, the faster the process is performed.

However, in a process of reading with a barcode reader, including the inventory process, read errors or incorrect recognition due to various factors occur, and, as a result, a barcode is sometimes not correctly read. These factors include differences (in reflectivity or the like) in the material of the barcode label 6A, the accuracy in positioning between the barcode reader and the barcode label 6A, and ambient light due to sheet metal of storage cells.

It is described below that occurrence of read errors or incorrect recognition is caused by difference in material of the barcode label 6A.

A label base material that is best suited to the library device 1 (the transfer robot 5) of each maker is used for the barcode label 6A. A barcode reader is often tuned so as to be able to most appropriately read the barcode label 6A.

In many barcode readers using monochrome CCD linear sensors, each of the barcode readers have a single reference level for determining whether the bar of the barcode label 6A is white or black. Therefore, when the medium cartridges 6 onto which the barcode labels 6A of a plurality of different label base materials are affixed are stored and used in one library device 1, differences in reflectivity of light among the barcode labels 6A sometimes cause read errors with a barcode reader.

In this case, operations of changing the read level and rereading a barcode are repeated, and therefore it takes time to complete retry processing. Additionally, when a plurality of scans are performed on one barcode label 6A, changing the read level leads to a plurality of scans having to be retried. Therefore, a response time to the host may be delayed.

It is described below that occurrence of read errors or incorrect recognition is caused by accuracy in positioning between a barcode reader and the barcode label 6A.

Figure 7:
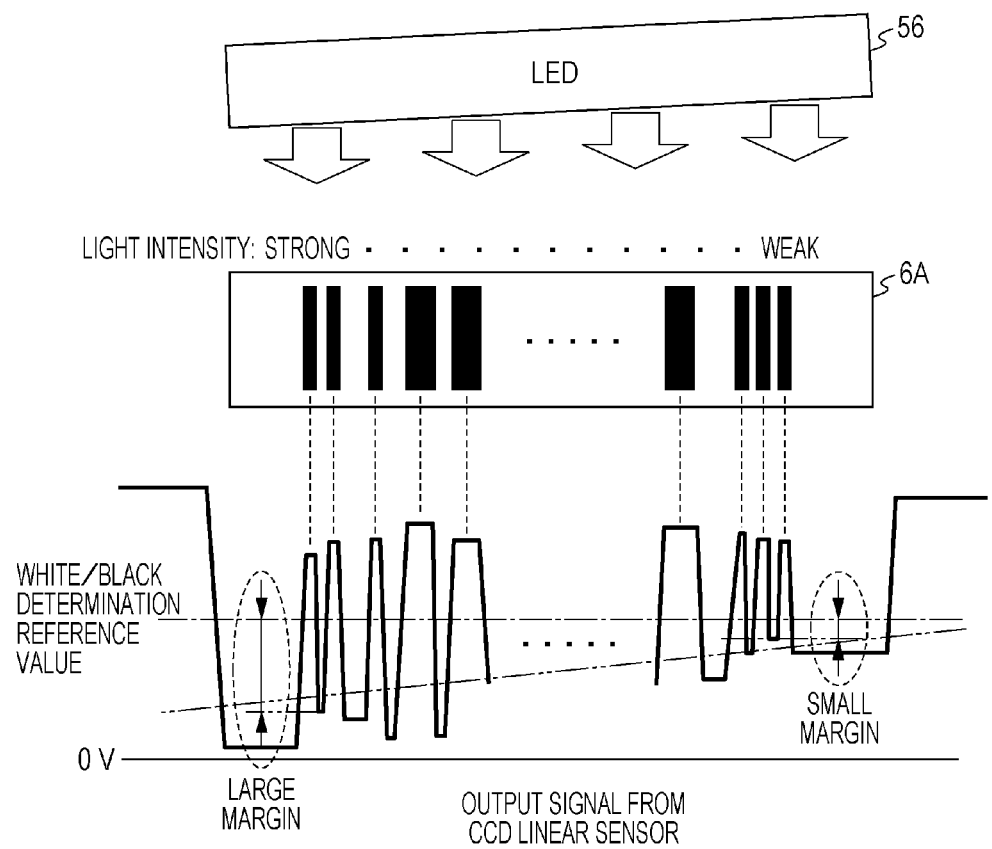
FIG. 7 is a diagram illustrating an example of a relationship between the accuracy of positioning between a barcode reader and a barcode label and the output signals from a CCD linear sensor.

As illustrated in FIG. 7, regarding light applied from the barcode reader attached to the movable transfer robot 5, when the accuracy in positioning between the transfer robot 5 and the barcode label 6A is low, the reflected light from the barcode label 6A is polarized. In the example of FIG. 7, the light intensity is the strongest at the left edge of the barcode label 6A and gradually becomes weaker toward the right edge.

Therefore, output signals (voltage signals) in accordance with the intensities of received light in the CCD linear sensor are not uniform and thus the accuracy of reading decreases. In the example of FIG. 7, from the left edge of the barcode label 6A toward the right edge, the output signal approaches a reference for determining whether a barcode is black or white and the margin decreases. Therefore, incorrect detection is more likely to occur in white/black determination.

It is described below that occurrence of read errors or incorrect recognition is caused by ambient light due to sheet metal or like of storage cells.

Figure 8:
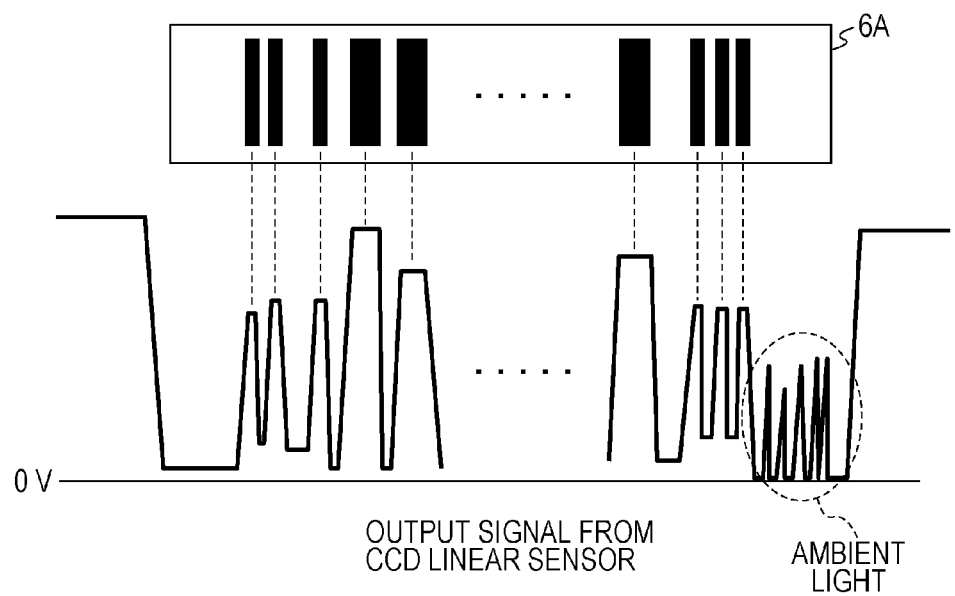
FIG. 8 is a diagram illustrating an example of output signals from the CCD linear sensor when ambient light occurs.

As illustrated in FIG. 8, a barcode reader sometimes detects reflected light (ambient light) from an object other than the barcode label 6A. Reflected light is likely to cause noise (a signal with a short width) in a signal output at an end of the barcode label 6A in the CCD linear sensor and thus to cause incorrect recognition during reading (during decoding) in the upper-level control unit 8.

Figure 9:
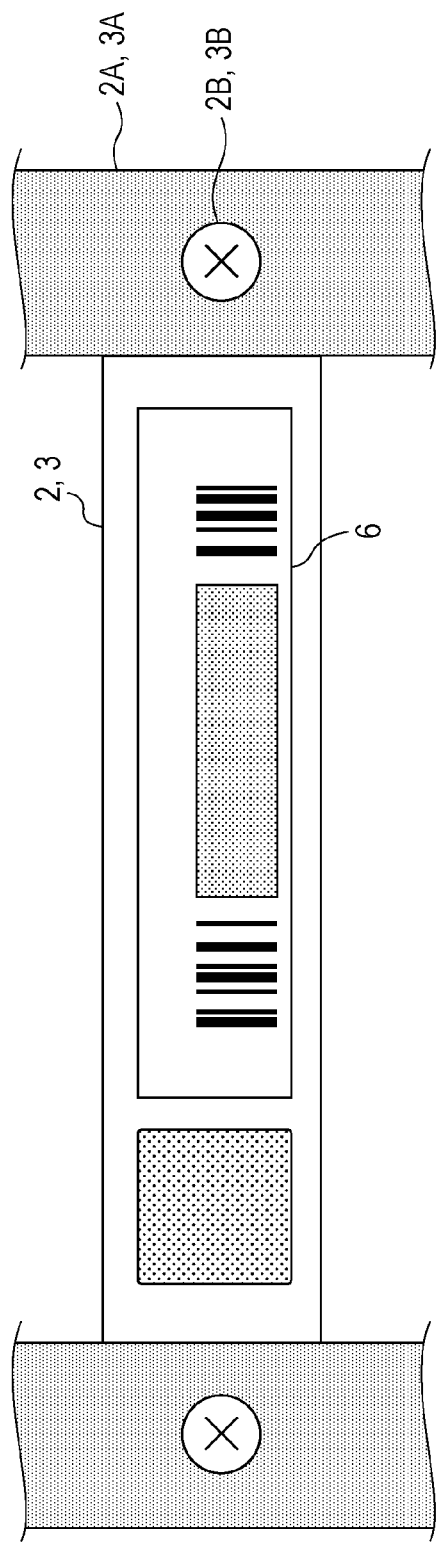
FIG. 9 is a diagram illustrating an example in which sheet metal and screws of a back cell and a side cell are painted black.

In order to reduce incorrect recognition of a barcode and accurately read the barcode, it is effective to take a measure against reflection that suppresses reflection light from objects other than the label in the periphery of the barcode label 6A. As a measure against reflection, as illustrated in FIG. 9, painting, in black, sheet metal 2A and sheet metal 3A, screws 2B and 3B, and so on of the back cell 2 and the side cell 3 is considered. However, painting these parts black results in the library device 1 having expensive parts.

In contrast, the library device 1 according to the embodiment may improve barcode reading performance by using the barcode reader 10 described in detail below. Details of the barcode reader 10 will be described below.

Figure 10:
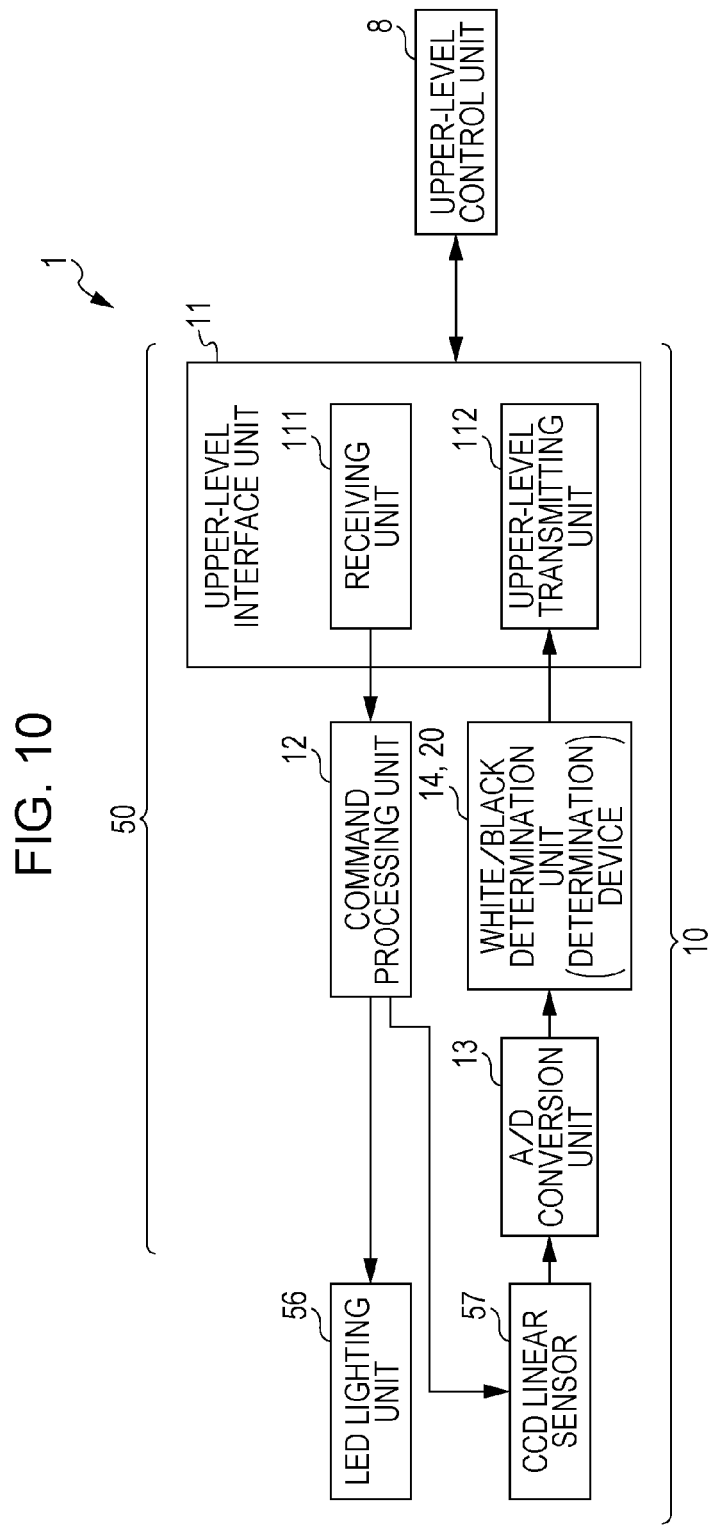
FIG. 10 is a diagram illustrating an example of a configuration of a barcode reader according to the embodiment.

FIG. 10 illustrates an example of a configuration of the barcode reader 10 according to the embodiment. The barcode reader 10 includes, by way of example, an upper-level interface unit 11, a command processing unit 12, an analog-to-digital (A/D) conversion unit 13, a white/black determination unit 14, an LED lighting unit 56, and a CCD linear sensor 57. Note that at least one of the upper-level interface unit 11, the command processing unit 12, the A/D conversion unit 13, and the white/black determination unit 14 may be included as an integrated circuit in the control board 50. The barcode reader 10 is an example of a "read device". The control board 50 includes a processor and a memory as one example. The memory stores programs and data described below. The processor executes a processing of the upper-level interface unit 11, a processing of the command processing unit 12 and a processing of the white/black determination unit 14 using the programs and the data stored in the memory.

The upper-level interface unit 11 communicates with the upper-level control unit 8 and includes, by way of example, a receiving unit 111 that accepts an instruction (a command) from the upper-level control unit 8, and an upper-level transmitting unit 112 that transmits a scan result of a barcode to the upper-level control unit 8.

The command processing unit 12, in response to an instruction from the upper-level control unit 8 received by the receiving unit 111, controls lighting of the LED lighting unit 56 and scanning of the CCD linear sensor 57.

The A/D conversion unit 13 converts a scan result of a barcode obtained by the CCD linear sensor 57, that is, scan data (output signals) in accordance with light intensity from the LED lighting unit 56 from analog to digital and feeds the scan data to the white/black determination unit 14.

The white/black determination unit 14 performs white/black determination processing on the scan data converted to digital signals by the A/D conversion unit 13 and feeds a determination result to the upper-level transmitting unit 112. That is, the white/black determination unit 14 is an example of a determination device 20 (data determination device) that determines data of a barcode of the medium cartridge 6.

Figure 11:
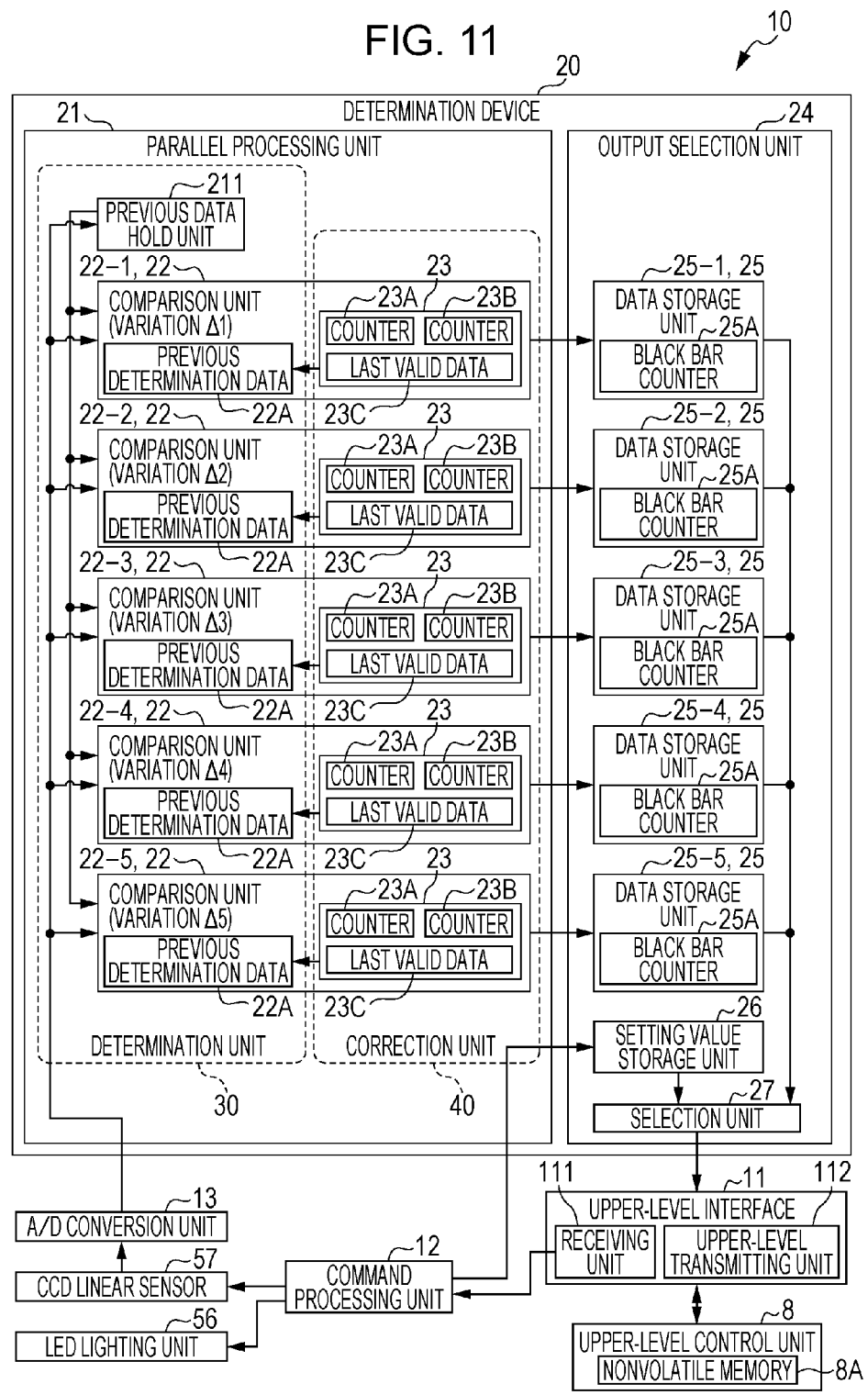
FIG. 11 is a diagram illustrating an example of a configuration of a determination device according to the embodiment.

Next, with reference to FIG. 11, details of the determination device 20 according to the embodiment will be described. As illustrated in FIG. 11, the determination device 20 includes, by way of example, a parallel processing unit 21 and an output selection unit 24. A processing of the parallel processing unit 21 and a processing of the output selection unit 24 are executed by the processor described above.

The parallel processing unit 21 performs white/black determination processing in which it is determined based on a plurality of different criteria whether the input scanned data of a barcode is white or black.

The output selection unit 24 selects a determination result using one determination criterion from determination results of white/black determinations, in accordance with a selection condition preset from a given barcode standard, and outputs the selected determination result to the upper-level control unit 8.

Next, details of the parallel processing unit 21 will be described. Note that, in the description given below, it is assumed that output signals from the CCD linear sensor 57 are converted into data values ranging from 0 to 255 by the A/D conversion unit 13.

As illustrated in FIG. 11, the parallel processing unit 21 includes, by way of example, the previous data hold unit 211 and a plurality of (five in FIG. 11) comparison units 22-1 to 22-5 (hereinafter individually referred to as a comparison unit 22 when they are not discriminated from one another).

The previous data hold unit 211 holds scan data (data value) previously input from the A/D conversion unit 13 and, during the white/black determination processing, feeds the held previous data to each comparison unit 22. Note that 255 may be set as an initial value in the previous data hold unit 211 by the A/D conversion unit 13 before scanning is started.

The comparison units 22 (an example of determination units) each perform white/black determination processing using data input from the A/D conversion unit 13, the previous data input from the previous data hold unit 211, and respective different determination criteria, and output determination data representing white or black. By way of example, the comparison units 22-1 to 22-5 hold their respective variations $\Delta 1$ to $\Delta 5$. In the example of FIG. 11, each variation $\Delta n$ (n being a natural number) is set such that a variation $\Delta 1=20$, a variation $\Delta 2=40$, a variation $\Delta 3=60$, a variation $\Delta 4=80$, and a variation $\Delta 5=100$.

With reference to FIG. 12, an example of white/black determination processing performed by the comparison unit 22 will be described. FIG. 12 is a diagram illustrating an example of a result of sampling performed by the A/D conversion unit 13 for part (enlarged view) of an output waveform from the CCD linear sensor 57. Note that, in FIG. 12, a long sampling period is used for easy explanation.

Each comparison unit 22 compares digital data output from the A/D conversion unit 13 by way of sampling at a regular interval indicated by a vertical broken line with the previous data held by the previous data hold unit 211. For example, the comparison unit 22 subtracts digital data from the A/D conversion unit 13 from the previous data and acquires (stores) a difference ΔX.

Then, each comparison unit 22 performs white/black determination by determining whether or not the absolute value of a comparison result (difference ΔX) is larger than a variation Δn, which is a determination criterion held by each comparison unit 22.

For example, if the absolute value of the difference ΔX is less than or equal to the variation Δn, the comparison unit 22 determines that the white/black determination result is not changed from the previous one, and sets (outputs) the result of the previous white/black determination as the current white/black determination result. On the other hand, if the absolute value of the difference ΔX is larger than the variation Δn, depending on whether the difference ΔX is positive or negative, the comparison unit 22 sets "0" as the white/black determination result if the difference ΔX is positive (plus) and sets "1" as the white/black determination result if the difference ΔX is negative (minus). At this point, the comparison unit 22 sets the result of the previous white/black determination if the previous white/black determination result is the same as the current white/black determination result.

Note that, as illustrated in FIG. 11, the comparison unit 22 may hold previous determination data 22A as the result of the previous white/black determination. Note that before scanning is started, the previous determination data 22A may be set to "1" (black) as the initial value.

A determination result example 61 in each comparison unit 22 when data illustrated in FIG. 12 is input by the A/D conversion unit 13 is illustrated in FIG. 13. Operations of the comparison unit 22 at timings t0 to t5 in the example of FIG. 13 will be described with regard to the comparison 22-4 having the variation Δ4. Note that the previous determination data 22A is set to "1" (black) as the initial value, and the previous data hold unit 211 is set to 255 indicating the limit of digital data after A/D conversion, as the initial value.

Timing t0

The comparison unit 22-4 receives the initial value=255 of the previous data hold unit 211 and the data value=245 after A/D conversion at a timing t0, and computes a difference therebetween, thus obtaining ΔX=255−245=10. Subsequently, the comparison unit 22-4 compares ΔX=10 with a variation Δ4=80, determines that Δ4 is larger, and outputs the previous determination data 22A (initial value="1" (black)).

Timing t1

The comparison unit 22-4 receives data=245 of the previous data hold unit 211 and a data value=245 at a timing t1 and computes a difference therebetween, thus obtaining ΔX=245−245=0. Subsequently, the comparison unit 22-4 compares ΔX=0 with the variation Δ4=80, determines that Δ4 is larger, and outputs the previous determination data 22A ("1" (black)).

Timing t2

The comparison unit 22-4 receives data=245 of the previous data hold unit 211 and a data value=180 at a timing t2 and computes a difference therebetween, thus obtaining ΔX=245−180=65. Subsequently, the comparison unit 22-4 compares ΔX=65 with the variation Δ4=80, determines that Δ4 is larger, and outputs the previous determination data 22A ("1" (black)).

Timing t3

The comparison unit 22-4 receives data=180 of the previous data hold unit 211 and a data value=105 at a timing t3 and computes a difference therebetween, thus obtaining ΔX=180−105=75. Subsequently, the comparison unit 22-4 compares ΔX=75 with the variation Δ4=80, determines that Δ4 is larger, and outputs the previous determination data 22A ("1" (black)).

Timing t4

The comparison unit 22-4 receives data=105 of the previous data hold unit 211 and a data value=20 at a timing t4 and computes a difference therebetween, thus obtaining ΔX=105−20=85. Subsequently, the comparison unit 22-4 compares ΔX=85 with the variation Δ4=80, determines that ΔX is larger, determines that ΔX is positive and the previous determination data is "1" (black), and sets "0" (white).

Timing t5

The comparison unit 22-4 receives data=20 of the previous data hold unit 211 and a data value=20 at a timing t5 and computes a difference therebetween, thus obtaining ΔX=20−20=0. Subsequently, the comparison unit 22-4 compares ΔX=0 with the variation Δ4=80, determines that Δ4 is larger, and outputs the previous determination data 22A ("0" (white)).

As described above, the comparison unit 22 performs white/black determination on a variation at each point from the timing t0 to the timing t5 using the determination criterion Δn varying for each comparison unit 22. Note that, regarding the comparison unit 22, the determination process described above is performed in parallel by a plurality of comparison units 22 during one scan performed by the barcode reader 10, that is, while all pieces of digital data from one end to the other end of the barcode label 6A are sequentially input from the A/D conversion unit 13.

In such a manner, the plurality of comparison units 22 are an example of a plurality of determination units that determine, based on respective different determination criteria, whether each of plural pieces of data output from a read unit in response to an instruction for reading a barcode represents either a first value or a second value.

Thus, the parallel processing unit 21 may perform determination processing on one piece of data output from the CCD linear sensor 57 simultaneously and in parallel by using the plurality of comparison units 22 having different white/black determination criteria.

Accordingly, when the label base materials of the barcode labels 6A of a plurality of medium cartridges 6 stored in the library device 1 are different from one another, the barcode reader 10 may accurately read barcodes by using the comparison units 22 having reference levels suitable for respective label base materials. That is, it is possible to read barcode labels 6A of a plurality of different kinds of base materials, and it is possible to use the medium cartridges 6 of other makers within the same library device 1.

The comparison unit 22 may perform white/black determination on a difference between the previous data obtained by sampling and the data obtained by A/D conversion, using the variation Δn set for each comparison unit 22 as a determination criterion, not a reference value of, for example, several volts for white/black determination.

Thus, the barcode reader 10 may normalize the determination process using a reference called a variation without being affected by a margin between the reference value and the data value. Therefore, read errors caused by an imbalance in output levels of the CCD linear sensor may be suppressed.

Referring back to FIG. 11, the comparison unit 22 may include a noise removal unit 23 as illustrated in FIG. 11. The noise removal unit 23 performs a noise removal process that removes effects of noise due to ambient light and the like from a result of white/black determination performed by the comparison unit 22.

For example, the noise removal unit 23 receives data "1" or "0" output from the comparison unit 22, determines whether or not the same value has been received continuously m or more times (m being a natural number of, for example, three), which is a prescribed (given) number of times, and generates data to be output to the output selection unit 24.

If the noise removal unit 23 receives the same data continuously three times or more, the noise removal unit 23 determines that the data from the comparison unit 22 is valid data and outputs the data to the output selection unit 24. On the other hand, if data received by the noise removal unit 23 is data continuously received less than three times, the noise removal unit 23 determines that the received data from the comparison unit 22 is invalid data and outputs valid data most recently determined (the last valid data) to the output selection unit 24.

That is, if the determination result provided by the comparison unit 22 represents one of the first value and the second value continuously a given number of times or more, the noise removal unit 23 determines that the determination result as a valid determination result and outputs it to a selection unit 27. If the determination result represents one of the values prior to representing the other of the values continuously the given number of times, the noise removal unit 23 determines that the determination result is an invalid determination result, changes the determination result to a valid determination result just previously determined, and outputs the valid determination result to the selection unit 27. The noise removal unit 23 is an example of a correction unit.

Therefore, the noise removal unit 23, as illustrated in FIG. 11, includes a counter 23A and a noise detection counter 23B and may hold last valid data 23C.

For example, the noise removal unit 23 increments the counter 23A when data received from the comparison unit 22 is the same as the previous determination data 22A. Then, if the count value of the counter 23A reaches three, this data is output as valid data to the output selection unit 24 and this data is held as the last valid data 23C.

On the other hand, the noise removal unit 23 resets the counter 23A if the received data is different from the previous determination data 22A, and, since invalid data is detected, increments the noise detection counter 23B and outputs the last valid data 23C to the output selection unit 24. Note that the noise removal unit 23 adds a count to the noise detection counter 23B, so that the count is accumulated, each time invalid data is detected until one scan is completed and outputs the accumulated value to the output selection unit 24 when one scan is completed.

Note that the noise removal unit 23, upon comparing determination data from the comparison unit 22 with the previous determination data 22A, updates the previous determination data 22A with the determination data.

Here, the prescribed number m, which serves as a criterion with which the noise removal unit 23 determines that determination data from the comparison unit 22 is valid data, may be determined based on the bar width of a barcode.

As described above, ambient light due to sheet metal of storage cells, or the like is often smaller in width than a bar of a barcode. The same applies to noise of small data or the like such as a stain and damage on the barcode label 6A.

Therefore, the number m sufficient for determining a white bar or a black bar is set based on the sampling period and the bar width of a barcode. This may reduce the possibility that ambient light and noise will be determined as a bar and may suppress read errors or incorrect recognition.

In this way, the noise removal unit 23 monitors the continuity of data of determination performed by the comparison unit 22 and may process the width that does not meet barcode standards, as invalid data. That is, by using the noise removal unit 23, noise detection and correction during scanning of a barcode may be performed. Thus, it is possible to avoid decreasing in the accuracy of reading and incorrect recognition caused by various factors in the environment of a barcode reader 10 and to reduce retry processing and read errors in scanning of the barcode label 6A. Therefore, a decrease in processing speed of the inventory process may be reduced.

Typical processed steel sheets and nickel plated screws may be used for the sheet metal 2A and the sheet metal 3A (mechanism units) and the screws 2B and 3B in the periphery of storage cells on the side of the library device 1. This results in a reduction in cost.

As described above, the parallel processing unit 21 monitors and compares a white bar and a black bar of the barcode as data (voltage values) arranged successively along a time series, and thus may remove, as noise, small data or the like such as a stain and damage on a label and correct a scan result of a bar. Thus, reading accuracy may be improved.

Next, details of the output selection unit 24 will be described.

The output selection unit 24 includes, by way of example, a plurality of (five in FIG. 11) data storage units 25-1 to 25-5, a setting value storage unit 26, and the selection unit 27. In the data storage units 25-1 to 25-5, data "1" or "0" output from the comparison units 22-1 to 22-5 (noise removal units 23) for at least one scan is accumulated and stored. Note that hereinafter, the data storage units 25-1 to 25-5 are individually referred to simply as a data storage unit 25 when they are not discriminated from one another.

The data storage unit 25 includes a black bar counter 25A and, upon detection of an edge of a black bar from data received from the comparison unit 22, increments the black bar counter 25A and thus counts the number of black bars detected during one scan.

The Code 39 standard is often used for the barcode label 6A of a magnetic tape cartridge. Code 39 defines that one character is represented by total nine bars including five black bars and four white bars, and among them, three bars are bold (code).

The barcode label 6A is made of 10 characters composed of a start+8 characters+a stop=10 characters, and therefore there are 50 black bars in one barcode label 6A.

The data storage unit 25 detects a black bar by detecting a change from white to black for determination data received from the comparison unit 22, and increments the black bar counter 25A by one. This process is performed in parallel in the data storage units 25-1 to 25-5 for determination data transmitted from the comparison units 22-1 to 22-5.

The setting value storage unit 26 stores a value instructed as a black bar count value in accordance with a command instruction from the upper-level control unit 8, and an arbitrary value may be set via the command processing unit 12 from the upper-level control unit 8. An arbitrary value may be set as a black bar count value, and therefore the determination device 20 may detect black bars of an arbitrary number of characters and marks unique to the device other than characters, other than the barcode label 6A of the medium cartridge 6 (magnetic tape cartridge).

The selection unit 27, upon completion of one scan of the barcode label 6A, refers to information on the black bar counter 25A of each data storage unit 25 and checks for the black bar counter 25A whose count value is equal to a black bar count value (for example, 50) set in the setting value storage unit 26.

Then, the selection unit 27 selects the black bar counter 25A whose count value is equal or close to 50 and selects, as output data, data stored in the data storage unit 25 of the selected black bar counter 25A.

In this way, the selection unit 27 may select a plurality of determination results obtained by one comparison unit 22 from a plurality of determination results obtained by each comparison unit 22 for a plural pieces of data, based on a selection condition preset in accordance with the barcode standard, and output the selected determination results to the source of an instruction for reading.

Note that when the black bar counter 25A whose count value is equal to 50 is absent but the black bar counter 25A whose count value is larger than 50 (for example, 52) and the black bar counter 25A whose count value is less than 50 (for example, 49) are present, it is preferable that the selection unit 27 select the black bar counter 25A whose count value is larger than 50. This is because, since 50 black bars are present in the barcode label 6A as described above, selecting output data where the number of black bars is larger than 50 (excessive black bars) is more likely to lead to normal recognition (correction) of the data in the upper-level control unit 8 than selecting output data where the number of black bars is less than 50 (insufficient black bars).

If a plurality of black bar counters 25A have count values equal or close to 50, the selection unit 27 selects one black bar counter 25A based on any of the following preset selection conditions (i) to (iv).

(i) When a plurality of and an odd number of data storage units 25 are applicable and their numbers (for example, reference numerals) are consecutive (for example, reference numerals 25-1 to 25-3), the data storage unit 25 having a center number (in this case, reference numeral 25-2) is selected.

(ii) When a plurality of and an even number of data storage units 25 are applicable and their numbers are consecutive (for example, reference numerals 25-1 to 25-4), from the data storage units 25 at the center thereof (in this case, reference numerals 25-2 and 25-3), the data storage unit 25 (in this case, reference numeral 25-3 of reference numerals 25-2 and 25-3) close to the center (reference numeral 25-3) of all the data storage units 25 (reference numerals 25-1 to 25-5) is selected.

(iii) When a plurality of and an odd number of data storage units 25 are applicable and their numbers are not consecutive (for example, reference numerals 25-1, 25-2, and 25-4), the data storage unit 25 having the center number (in this case, reference character 25-2) is selected.

(iv) When a plurality of and an even number of data storage units 25 are applicable and their numbers are not consecutive (for example, reference numerals 25-1, 25-2, 25-3, 25-5), from the data storage units 25 at the center thereof (in this case, reference numerals 25-2 and 25-3), the data storage unit 25 (in this case, reference numeral 25-3 of reference numerals 25-2 and 25-3) close to the center (reference numeral 25-3) of all the data storage units 25 (reference characters 25-1 to 25-5).

The output data from the data storage units 25 (25-1 to 25-5) selected as valid data, through the above control, by the selection unit 27 is transmitted together with the count values (accumulated values) of the black bar counters 25A and the noise detection counters 23B to the upper-level control unit 8.

Thus, the upper-level control unit 8, having received data, may perform decode processing on read data (a scan result) of the barcode label 6A and store each count value together with the decoded data. Note that the upper-level control unit 8 may include a nonvolatile memory 8A for holding the count value.

For example, the upper-level control unit 8, when registering a volume label of the medium cartridge 6, may confirm by reference to the nonvolatile memory 8A whether the upper-level control unit 8 has read the volume label. Thus, if the upper-level control unit 8 has read the volume label, the upper-level control unit 8 compares the noise count value at that time and the noise count value in the current reading. If there is a large difference (for example, 20) between the compared values, the upper-level control unit 8 may determine that stains, damage, and the like on the barcode label 6A have increased. In such a manner, degradation over time of the barcode label 6A may be detected on the side of the library device 1. This makes it possible to prompt an operator to visually examine the barcode label 6A and to replace the barcode label 6A by, for example, providing alarm notification to the host 7 or the like.

In such a manner, the output selection unit 24 includes the data storage unit 25 that stores a plurality of determination results output from a respective one of a plurality of comparison units 22 for the respective one of the comparison units 22, and a plurality of black bar counters 25A that count, for the respective one of the comparison units 22, the number of times a plurality of determination results have changed from the first value to the second value. Then, the selection unit 27 selects a plurality of determination results stored in the data storage unit 25 corresponding to the black bar counter 25A whose count value is close to a given value.

Accordingly, the output selection unit 24 may select one optimum data from a plurality of processing results obtained by the parallel processing unit 21 in accordance with selection conditions preset from the barcode standard and output the optimum data to the upper-level control unit 8.

Note that once processing per scan performed by the parallel processing unit 21 and the output selection unit 24 described above is completed, the upper-level control unit 8 may cause the barcode reader 10 to perform a plurality of scans of the barcode label 6A while changing the position as illustrated in FIG. 6.

As described above, the determination device 20 according to the embodiment may perform white/black determination in light of a plurality of references in consideration with the material, characteristics, and so on of the barcode label 6A. Additionally, the determination device 20 monitors the continuity of changes from black to white or from white to black and may remove a drawback due to a barcode shortage and noise from a determination result in light of the format of the barcode label 6A. Furthermore, the determination device 20 may count the number of times a black bar appears, and employ a read determination result that matches a prescribed value, as a read result.

Accordingly, the barcode reading performance of the barcode reader 10 may be improved. This may suppress read errors or incorrect recognition and may contribute to improvement in performance of the entire library device 1.

Next, an operation example of the determination device 20 of the barcode reader 10 configured as described above will be described with reference to FIG. 14 to FIG. 17.

First, with reference to FIG. 14 and FIG. 15, an example of the determination (comparison) process and the noise removal process performed by the parallel processing unit 21 will be described. Note that the process illustrated in FIG.

Figure 14:
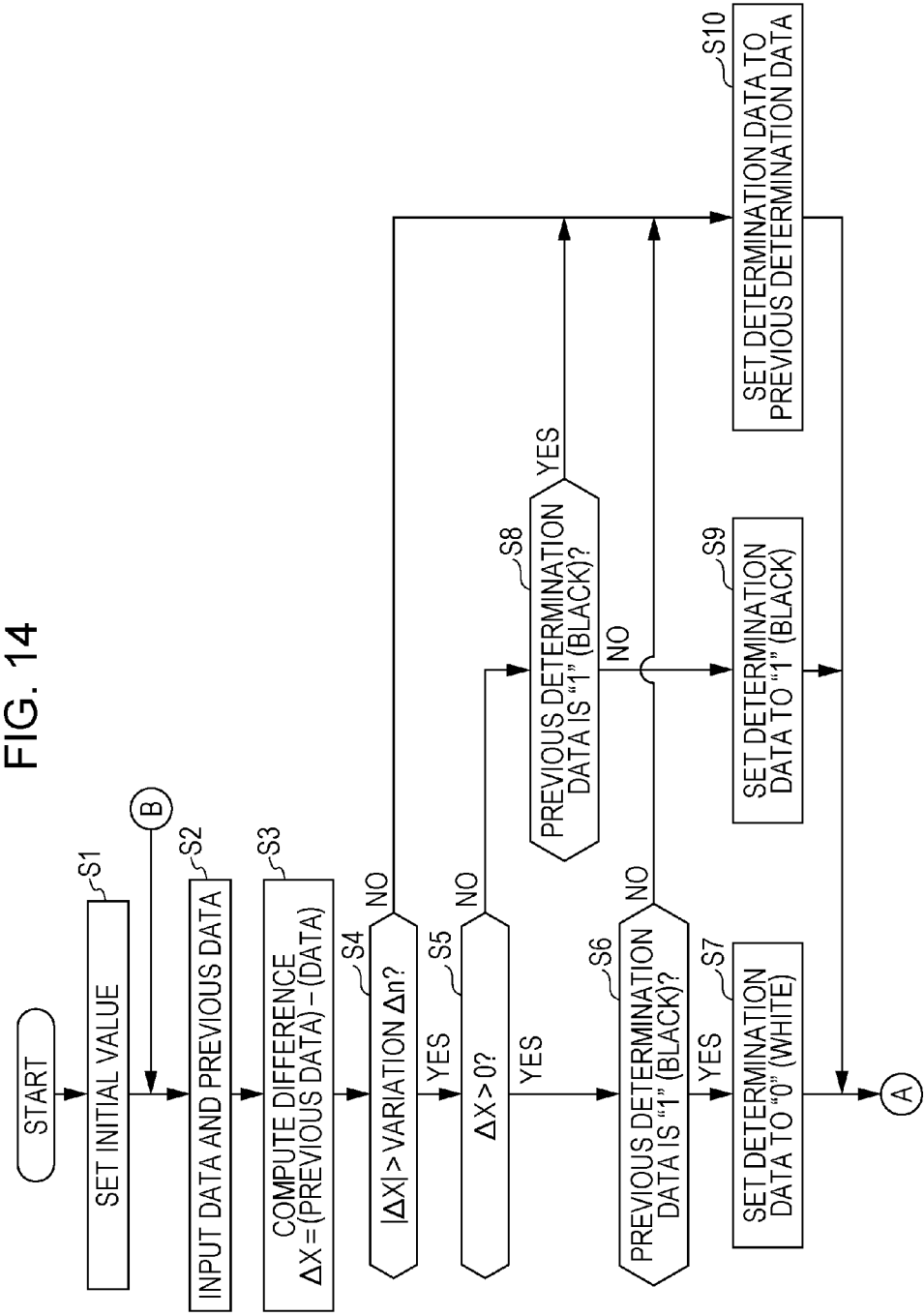
FIG. 14 is a flowchart illustrating an example of a determination (comparison) process performed by a parallel processing unit according to the embodiment.
Figure 15:
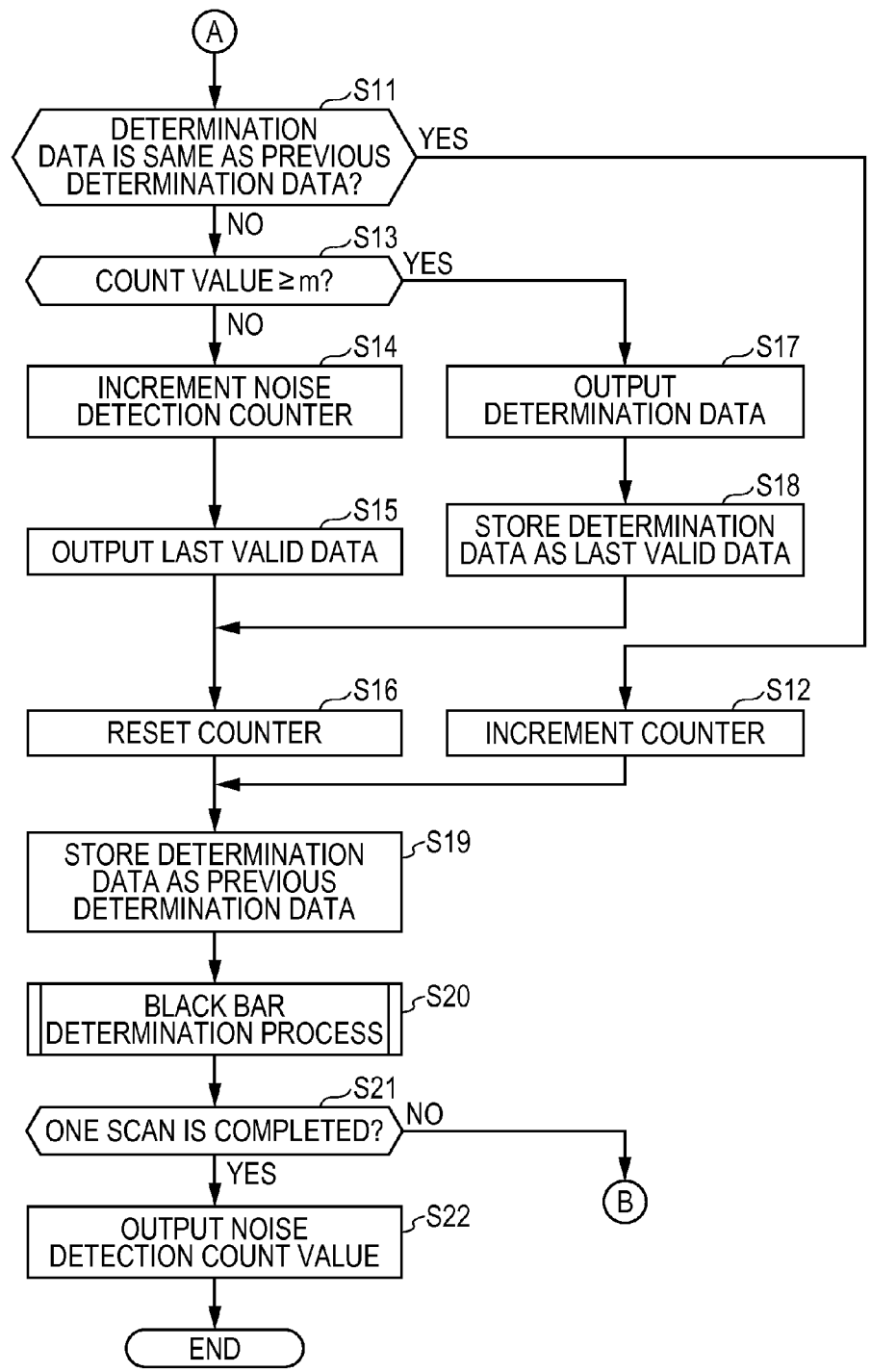
FIG. 15 is a flowchart illustrating an example of a noise removal process performed by the parallel processing unit according to the embodiment.

14 and FIG. 15 are a process in one comparison unit 22 that is performed at a timing of one sampling in one scan. Accordingly, in reality, the process illustrated in FIG. 14 and FIG. 15 is performed at the same time by all the comparison units 22 (as many as the number of comparison units 22 arranged in parallel) and is performed at a plurality of sampling timings until one scan is completed.

As illustrated in FIG. 14, the upper-level control unit 8 or the command processing unit 12 sets 255 and "1" (black) as initial values for the previous data hold unit 211 and the previous determination data 22A, respectively, through the A/D conversion unit 13 (step S1). Subsequently, once the LED lighting unit 56 is turned on and reflected light from the barcode label 6A is received by the CCD linear sensor 57, the output signal is converted from analog to digital by the A/D conversion unit 13. Then, the A/D conversion unit 13 and the previous data hold unit 211 input the converted digital data and the previous data (the initial value for the first time) to each comparison units 22, respectively (step S2).

Each comparison unit 22 computes a difference ΔX by subtracting digital data from the A/D conversion unit 13 from the input previous data (step S3). Each comparison unit 22 determines whether or not the absolute value of the computed difference ΔX is larger than the variation Δn unique to each comparison unit 22 (step S4).

If the absolute value of the difference ΔX is larger than the variation Δn (Yes route of step S4), the comparison unit 22 determines whether or not the difference ΔX is larger than zero (step S5).

If the difference ΔX is larger than zero (Yes route of step S5), the comparison unit 22 determines whether or not the previous determination data 22A is "1" (black) (step S6).

If the previous determination data 22A is "1" (black) (Yes route of step S6), the comparison unit 22 sets the determination data to "0" (white) (step S7) and the process proceeds to step S11 illustrated in FIG. 15.

On the other hand, if the previous determination data 22A is not "1" (black) (that is, "0" (white)) in step S6 (No route of step S6), the comparison unit 22 sets the determination data to the previous determination data 22A ("0" (white)) (step S10), and the process proceeds to step S11 illustrated in FIG. 15.

If, in step S5, the difference ΔX is less than or equal to zero (that is, zero or negative) (No route of step S5), the comparison unit 22 determines whether or not the previous determination data 22A is "1" (black) (step S8).

If the previous determination data 22A is not "1" (black) (that is, "0" (white)) (No route of step S8), the comparison unit 22 sets the determination data to "1" (black) (step S9), and the process proceeds to step S11 illustrated in FIG. 15.

On the other hand, if, in step S8, the previous determination data 22A is "1" (black) (Yes route of step S8), the comparison unit 22 sets the determination data to the previous determination data 22A ("1" (black)) (step S10), and the process proceeds to step S11 illustrated in FIG. 15.

Additionally, if, in step S4, the absolute value of the difference ΔX is less than or equal to the variation Δn (No route of step S4), the comparison unit 22 sets the determination data to the previous determination data 22A (step S10), and the process proceeds to step S11 illustrated in FIG. 15.

In step S11 illustrated in FIG. 15, the noise removal unit 23 determines whether or not determination data from the comparison unit 22 is the same as the previous determination data 22A (step S11).

If the determination data is the same as the previous determination data 22A (Yes route of step S11), the noise removal unit 23 increments the counter 23A by one (step S12) and stores the determination data to the previous determination data 22A (step S19), and the process proceeds to step S20.

On the other hand, if, in step S11, the determination data is not the same as the previous determination data 22A (No route of step S11), the noise removal unit 23 determines whether or not the count value of the counter 23A is larger than or equal to m, which is the prescribed number (the given number) (step S13).

If the count value of the counter 23A is less than m (No route of step S13), the noise removal unit 23 determines that the determination data is invalid data, and increments the noise detection counter 23B by one (step S14). Then, the noise removal unit 23 outputs the last valid data 23C to the output selection unit 24 (step S15) and resets the counter 23A (step S16), and the process proceeds to step S19.

On the other hand, if, in step S13, the count value of the counter 23A is larger than or equal to m (Yes route of step S13), the noise removal unit 23 determines that the determination data is valid data, and outputs the determination data to the output selection unit 24 (step S17). Then, the noise removal unit 23 stores the determination data as the last valid data 23C (step S18), and the process proceeds to step S16.

In step S20, the black bar determination process (refer to FIG. 16) is performed by the output selection unit 24. Upon completion of the black bar determination process, the noise removal unit 23 (the parallel processing unit 21) determines whether or not one scan is completed (step S21).

If one scan is not completed (No route of step S21), the process proceeds to step S2 illustrated in FIG. 14.

On the other hand, if, in step S21, one scan is completed (Yes route of step S21), the noise removal unit 23 outputs a noise detection count value of the noise detection counter 23B to the output selection unit 24 (step S22), and the process ends.

Figure 16:
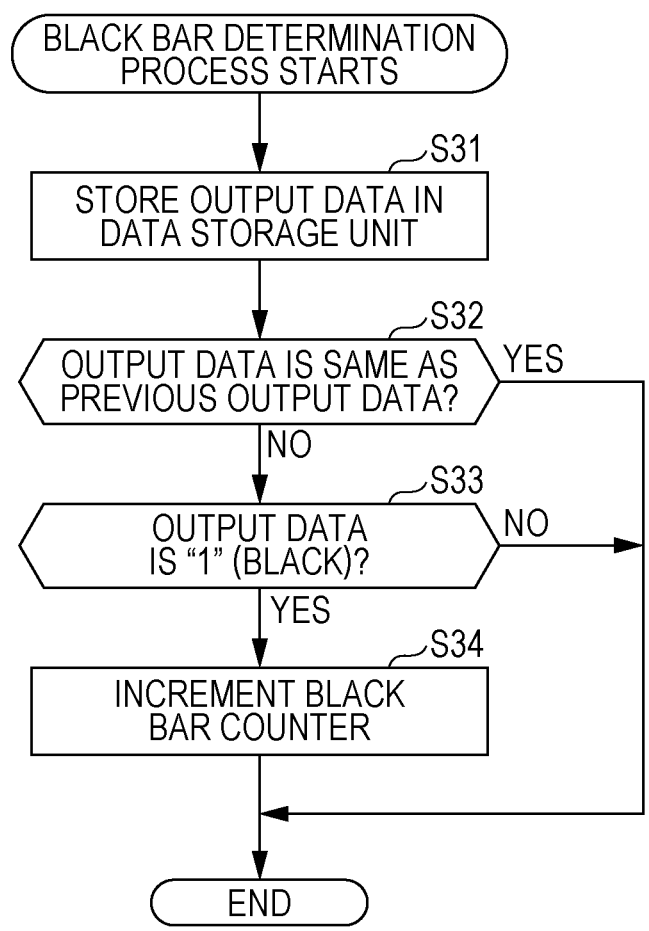
FIG. 16 is a flowchart illustrating an example of a black bar determination process performed by an output selection unit according to the embodiment.

Next, with reference to FIG. 16, an example of the black bar determination process performed by the output selection unit 24 will be described. Note that the process illustrated in FIG. 16 is a process in one data storage unit 25 performed at a timing of one sampling in one scan. Accordingly, in reality, the process illustrated in FIG. 16 is performed at the same time by all the data storage units 25 (the comparison units 22) (as many as the number of data storage units 25 arranged in parallel) and is performed following the processing of the comparison units 22 at timings of a plurality of samplings until one scan is completed.

As illustrated in FIG. 16, the output selection unit 24 stores output data from the noise removal units 23 (the parallel processing unit 21) in the corresponding data storage units 25 (step S31). Then, each data storage unit 25 determines whether or not the output data is the same as the previous output data (step S32).

If the output data is different from the previous output data (No route of step S32), the data storage unit 25 determines whether or not the output data is "1" (black) (step S33).

If the output data is "1" (black) (Yes route of step S33), the data storage unit 25 increments the black bar counter 25A by one (step S34), and the process proceeds to step S21 illustrated in FIG. 15.

On the other hand, if, in step S32, the output data is not the same as the previous output data (Yes route of step S32), or if, in step S33, the output data is not "1" (black) (that is, "0" (white)) (No route of step S33), the process proceeds to step S21 illustrated in FIG. 15.

Figure 17:
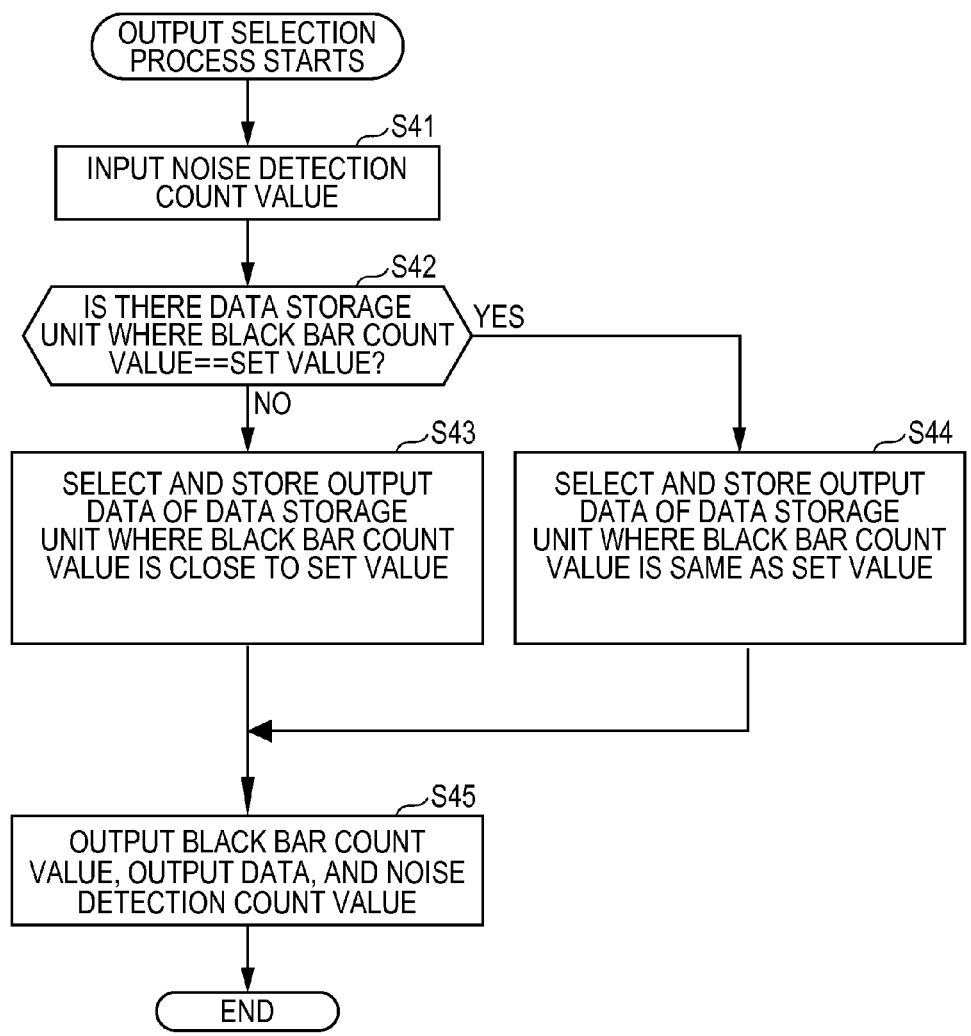
FIG. 17 is a flowchart illustrating an example of an output selection process performed by the output selection unit according to the embodiment.

Next, with reference to FIG. 17, an example of an output selection process performed by the output selection unit 24 will be described.

Once a noise detection count value (refer to step S22 illustrated in FIG. 15) is input from the noise removal unit 23 (step S41), the output selection unit 24 (the selection unit 27) determines whether or not the data storage unit 25 where the black bar count value of the black bar counter 25A is equal to the set value of the setting value storage unit 26 is present (step S42).

If the data storage unit 25 where the black bar count value is equal to the set value is absent (No route of step S42), the selection unit 27 selects the data storage unit 25 where the black bar count value is close to the set value, and stores the data (step S43). At this point, when a plurality of black bar count values are equal, the selection unit 27 selects the data storage unit 25 that meets the predetermined condition (refer to (i) to (iv) mentioned above). Then, the selection unit 27 transmits the black bar count value of the selected data storage unit 25, the output data, and the noise detection count value through the upper-level transmission unit 112 to the upper-level control unit 8 (step S45), and the process ends.

On the other hand, if the data storage unit 25 where the black bar count value is equal to the set value (Yes route of step S42), the selection unit 27 selects the data storage unit 25 where the black bar count value is the same as the set value, and stores the data (step S44). At this point, when a plurality of black bar count values are equal, the selection unit 27 selects the data storage unit 25 that meets the predetermined condition (refer to (i) to (iv) mentioned above). Then, the process proceeds to step S45.

Hereinbefore, although the embodiment of the present disclosure has been described in detail, the present disclosure is not limited to such a specific embodiment and may be carried out in various modifications and changes without departing the scope of the spirit of the present disclosure.

For example, although, in conjunction with FIG. 11, the determination device 20 has been described to include five comparison units 22 and five data storage units 25, the determination device 20 is not limited to this and may include four or fewer or six or more comparison units 22 and data storage units 25.

Additionally, although, in the above, description has been given assuming that, as white/black determination data, "0" represents white and "1" represents black, the white/black determination data is not limited to this. For example, "0" may represent black and "1" may represent white.

Furthermore, although, in the above, the determination device 20 (the white/black determination unit 14) has been described to be provided (mounted) in the barcode reader 10 of the transfer robot 5, the determination device 20 is not limited to this. For example, the determination device 20 may be provided in the upper-level control unit 8. In this case, digital data from the A/D conversion unit 13 may be transmitted via the upper-level transmission unit 112 to the upper-level control unit 8, and the determination device 20 may perform white/black determination processing in the upper-level control unit.

Functional blocks of the barcode reader 10 and the determination device 20 illustrated in FIG. 10 and FIG. 11 may each be merged or divided in any combination.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiment of the present invention has been described in detail, it should be understood that the various changes, substitutions, and alterations could be made hereto without departing from the spirit and scope of the invention.

What is claimed is:

1. A data determination device comprising:
   a plurality of determination units each including a first processor; and
   a second processor,
      wherein the second processor is configured to:
         receive plural data sets included in a sequence of read data of a barcode in response to an instruction for reading the barcode, and
         output the plural data sets in parallel to each of the plurality of determination units,
      wherein the first processor of each of the plurality of determination units being configured to:
         receive the plural data sets from the second processor,
         determine, based on respective different criteria, whether each of plural data sets represents either a first value or a second value, and
         output a determination result including values of the plural data sets each of which indicates one of the first and second values;
      wherein the second processor is further configured to:
         select, from the plurality of determination results respectively output from the plurality of first processors for the plural data sets, a representative determination result output from one of the plurality of first processors, based on a selection condition preset in accordance with a standard of the barcode, and
         output the selected representative determination result to a source of the instruction for reading the barcode.

2. The data determination device according to claim 1, wherein
   each of the plurality of determination units includes a memory and a counter coupled to the first processor of the each determination unit, the memory being configured to store an output from the first processor of the each determination unit, the counter being configured to count a number of times values of the plural data sets received by the first processor of the each determination unit have changed from the first value to the second value; and
   the second processor selects the determination result stored in the memory of one of the plurality of determination units including the counter whose count value is close to a given value.

3. The data determination device according to claim 2, wherein the given value represents a number of the first or second values included in the barcode defined by the standard of the barcode.

4. The data determination device according to claim 1, wherein the first processor of each of the plurality of determination units determines whether each of the plural data sets represents either the first value or the second value, based on a difference between a current piece of the each data set currently received from the second processor and a previous pieced of the each data set received from the second processor immediately previous to the current piece of the each data set, and a given variation having a value varying for each of the plurality of determination units.

5. The data determination device according to claim 1, wherein
when values of a determination result obtained by the first processor of each of the plurality of determination units continuously represent same one of the first value and the second value a given number of times or more, the first processor of the each determination unit determines that the determination result is a valid determination result and outputs the determination result to the second processor, and
when a value of the determination result obtained by the first processor of the each determination unit represents a value other than the first value and the second value before continuously representing the same one of the first value and the second value the given number of times, the first processor of the each determination unit determines that the determination result is an invalid determination result and changes the determination result to a valid determination result just previously determined and outputs the valid determination result to the second processor.

6. A library device for storing a plurality of recording media on each of which a barcode is displayed, the library device comprising:
a read device including:
a plurality of determination units each including a first processor, and
a second processor,
wherein the second processor is configured to:
read, in response to an instruction for reading a barcode, a barcode of one recording medium, and
output plural data sets included in a sequence of read data of the barcode in parallel to each of the plurality of determination units,
wherein the first processor of each of the plurality of determination units being configured to:
receive the plural data sets from the second processor,
determine, based on respective different criteria, whether each of the plural data sets represents either a first value or a second value, and
output a determination result including values of the plural data sets each of which indicates one of the first and second values,
wherein the second processor is further configured to:
select, from the plurality of determination results respectively output from the plurality of first processors for the plural data sets, a representative determination result output from one of the plurality of first processors, based on a selection condition preset in accordance with a standard of the barcode, and
output the selected representative determination result to a source of the instruction for reading the barcode.

7. The library device according to claim 6, wherein
each of the plurality of determination units includes a memory and a counter coupled to the first processor of the each determination unit, the memory being configured to store a determination result from the first processor of the each determination unit, the counter being configured to count, a number of times values of the plural data sets received by the first processor of the each determination unit have changed from the first value to the second value; and
the first processor selects the determination result stored in the memory of one of the plurality of determination units including the counter whose count value is close to a given value.

8. The library device according to claim 7, wherein the given value represents a number of the first or second values included in the barcode defined by the standard of the barcode.

9. The library device according to claim 6, wherein the first processor of each of the plurality of determination units determines whether each of the data sets represents either the first value or the second value, based on a difference between a current piece of the each set of data and previous piece of each set of data provided immediately previous to the current piece of the each set of data and a given variation having a value varying for each of the plurality of determination units.

10. The library device according to claim 6, wherein
when values of a determination result obtained by the first processor of each of the plurality of determination units continuously represent same one of the first value and the second value a given number of times or more, the first processor of the each determination unit determines that the determination result is a valid determination result and outputs the determination result to the second processor, and
when a value of the determination result obtained by the first processor of the each determination unit represents a value other than the first value and the second value before continuously representing same one of the first value and the second value the given number of times, the first processor of the each determination unit determines that the determination result is an invalid determination result and changes the determination result to a valid determination result just previously determined and outputs the valid determination result to the second processor.

11. A data determination method for determining read data of a barcode, the method being performed by a data determination device including a plurality of determination units including a first processor, and a second processor, the method comprising:
receiving, by the second processor, plural data sets included in a sequence of read data of the barcode in response to an instruction for reading the barcode, and outputting the plural data sets in parallel to each of a plurality of determination units;
receiving, by the first processor of each determination unit, the plural data sets from the second processor;
determining, by the first processor, based on respective different criteria, whether each of the plural data sets represents either a first value or a second value, and outputting a determination result including values of the plural data sets each of which indicates one of the first and second values;
selecting, by the second processor, the plurality of determination results respectively output from, for the plural pieces of data, obtained by one determination among the plurality of determinations, based on a selection condition preset in accordance with a standard of the barcode; and
outputting, by the processor, the selected plurality of determination results to a source of the instruction for reading the barcode.

12. The data determination method according to claim 11, further comprising:
- providing each of the plurality of determination units with a memory and a counter coupled to the first processor of the each determination unit;
- storing, by the first processor, for each of the plurality of determination units, the determination result determined by the first processor in the memory of the each determination unit;
- counting, by the first processor, for each of the plurality of determination units, a number of times values of the plural data sets received by the first processor of the each determination unit have changed from the first value to the second value; and
    - selecting, by the second processor, the determination result stored in the memory of one of the plurality of determination units including the counter whose count value is close to a given value.

13. The data determination method according to claim 12, wherein the given value represents a number of the first or second values included in the barcode defined by the standard of the barcode.

14. The data determination method according to claim 11, the method further comprising
- determining, by the first processor, whether each of the plural data sets represents either the first value or the second value, based on a difference between a current piece of the each data set currently received from the second processor and a previous piece of the each data set received immediately previous to the current piece of the each data set, and a given variation having a value varying for each of the plurality of determination units.

15. The data determination method according to claim 11, further comprising
- when values of a determination result obtained by the first processor of each of the plurality of determinations continuously represent same one of the first value and the second value a given number of times or more, determining, by the first processor of the each determination unit, that the determination result is a valid determination result; and
- when a value of the determination result obtained by the first processor of the each determination unit represents a value other than the first value and the second value before continuously representing the same one of the first value and the second value the given number of times, determining, by the first processor of the each determination unit, that the determination result is an invalid determination result and changes the determination result to a valid determination result just previously determined.

* * * * *